(12) United States Patent
Grbovic et al.

(10) Patent No.: US 9,070,093 B2
(45) Date of Patent: Jun. 30, 2015

(54) SYSTEM AND METHOD FOR GENERATING AN OCCUPANCY MODEL

(75) Inventors: Mihajlo Grbovic, Philadelphia, PA (US); Onno R. Zoeter, Grenoble (FR); Christopher R. Dance, Grenoble (FR); Guillaume Bouchard, Saint Martin le Vinoux (FR); Shengbo Guo, Saint-Martin-d'Heres (FR)

(73) Assignee: XEROX CORPORATION, Norwalk, CT (US)

( * ) Notice: Subject to any disclaimer, the term of this patent is extended or adjusted under 35 U.S.C. 154(b) by 409 days.

(21) Appl. No.: 13/438,313

(22) Filed: Apr. 3, 2012

(65) Prior Publication Data
US 2013/0262059 A1 Oct. 3, 2013

(51) Int. Cl.
G06G 7/48 (2006.01)
G06Q 10/04 (2012.01)
G08G 1/14 (2006.01)

(52) U.S. Cl.
CPC . *G06Q 10/04* (2013.01); *G08G 1/14* (2013.01)

(58) Field of Classification Search
CPC ......... G08G 1/14; G08G 1/141; G08G 1/145; G08G 1/146; G06Q 10/04
USPC .............................. 703/2, 6; 701/533; 706/12
See application file for complete search history.

(56) References Cited

U.S. PATENT DOCUMENTS

| | | | |
|---|---|---|---|
| 4,971,505 A | 11/1990 | Sawyer | |
| 5,432,508 A | 7/1995 | Jackson | |
| 6,344,806 B1 | 2/2002 | Katz | |
| 7,116,246 B2 | 10/2006 | Winter et al. | |
| 7,492,283 B1 | 2/2009 | Racunas, Jr. | |
| 7,647,185 B2 | 1/2010 | Tarassenko et al. | |
| 7,889,099 B2 | 2/2011 | Aubrey et al. | |
| 8,428,918 B2 * | 4/2013 | Atrazhev et al. | 703/2 |
| 2006/0250278 A1 | 11/2006 | Tillotson et al. | |
| 2009/0024430 A1 * | 1/2009 | Marcus | 705/7 |
| 2011/0213588 A1 * | 9/2011 | Lin et al. | 702/181 |
| 2013/0258107 A1 * | 10/2013 | Delibaltov et al. | 348/148 |

FOREIGN PATENT DOCUMENTS

WO WO 2009/154599 A1 12/2009

OTHER PUBLICATIONS

Tong et al "Estimation of parking accumulation profiles from survey data"., 2004. p. 183-202.*
Caliskan et al. "Predicting Parking Lot Occupancy in Vehicular Ad Hoc Networks"., IEEE 2007., p. 277-281.*

* cited by examiner

*Primary Examiner* — Eunhee Kim
(74) *Attorney, Agent, or Firm* — Fay Sharpe LLP

(57) ABSTRACT

A system and method for generating an occupancy model are disclosed. The model is learned using occupancy data for zones, each zone including cells, which are occupied or not at a given time, each with a sensor, which may be reporting or not. The data provides an observed occupancy corresponding to a number of cells in the respective zone which have reporting sensors, and the number of those sensors which are reporting that the respective cell is occupied. The occupancy model is based on a demand model and a sensor noise model which accounts for behavior of the non-reporting sensors. The noise model assumes that the probability of a sensor being in the reporting state is dependent on whether the respective cell is occupied or not. The model can fit the occupancy data better than one which assumes that non-reporting cells are occupied with the same frequency as reporting ones.

25 Claims, 12 Drawing Sheets though the exemplary embodiment relates to a system and method for generating a model for predicting the state of a set of cells, based on incomplete data. It finds particular application in connection with a parking occupancy detection system and will be described with particular reference thereto. However, it is to be appreciated that the system and method are applicable to other occupancy prediction problems.

SYSTEM AND METHOD FOR GENERATING AN OCCUPANCY MODEL

BACKGROUND

The exemplary embodiment relates to a system and method for generating a model for predicting the state of a set of cells, based on incomplete data. It finds particular application in connection with a parking occupancy detection system and will be described with particular reference thereto. However, it is to be appreciated that the system and method are applicable to other occupancy prediction problems.

Parking zone management systems have been developed which include a vehicle sensor for each parking space in a parking zone. The vehicle sensors each determine the occupancy status of the respective parking space, i.e., whether or not the space is free or is occupied by a vehicle. The occupancy data is communicated to a centralized system, allowing occupancy information to be made available, for example, to inform potential users of the parking zone that there are parking spaces available in the parking zone, or to provide information about a set of neighboring parking zones.

One problem which arises is that the vehicle sensors are prone to failure. When a sensor fails, it no longer reports the occupancy state (occupied or available) of its respective parking space. Thus, the number of available parking spaces in a parking zone is not accurately reported to the centralized system when on or more of the sensors fails. One way to address this problem is to assume that the occupancy of a non-reporting parking space can be predicted based on the output of the reporting sensors. A problem with this approach, which has been identified by the present applicants, is that this approach does not always accurately predict the occupancy status of parking spaces, since full spaces and empty spaces do not have missing measurements with equal probability.

Since the availability of parking spaces may be insufficient or barely sufficient to meet the demand of drivers, particularly during peak times, it would be desirable to have an accurate evaluation of the availability and location of parking spaces.

The present system and method address this problem and others by generating a model for predicting occupancy status of a set of cells, such as parking spaces, when the reporting data is incomplete.

INCORPORATION BY REFERENCE

The following references, the disclosures of which are incorporated herein by reference, in their entirety, are mentioned.

U.S. Pat. No. 7,889,099, issued Feb. 15, 2011, entitled PARKING-ZONE MANAGEMENT SYSTEM, by Aubrey, et al.

U.S. Pat. No. 7,647,185, issued Jan. 12, 2010, entitled APPARATUS AND METHOD FOR SENSING THE OCCUPANCY STATUS OF PARKING SPACES IN A PARKING LOT, by Tarassenko, et al.

U.S. Pat. No. 7,492,283, issued Feb. 17, 2009, entitled SYSTEMS AND METHODS FOR COMMUNICATION OF PARKING INFORMATION, by Racunas, Jr.

U.S. Pat. No. 7,116,246, issued Oct. 3, 2006, entitled APPARATUS AND METHOD FOR SENSING THE OCCUPANCY STATUS OF PARKING SPACES IN A PARKING LOT, by Winter, et al.

U.S. Pat. No. 6,344,806, issued Feb. 5, 2002, entitled PARKING STATUS CONTROL SYSTEM AND METHOD, by Katz.

U.S. Pat. No. 5,432,508, issued Jul. 11, 1995, entitled TECHNIQUE FOR FACILITATING AND MONITORING VEHICLE PARKING, by Jackson.

U.S. Pat. No. 4,971,505, issued Nov. 20, 1990, entitled ARCHITECTURAL STRUCTURE FOR OCCUPANCY AND PARKING, by Sawyer.

BRIEF DESCRIPTION

In accordance with one aspect of the exemplary embodiment, a computer implemented method includes receiving occupancy data for each of a plurality of zones. Each zone includes a respective set of cells and a sensor for each of the cells in the set of cells. Each of the cells is in one of a plurality of states at a time, the states including an occupied state and an unoccupied state. Each of the sensors is in one of a reporting state and a non-reporting state at a time. The occupancy data includes, for each of a plurality of times, an observed occupancy, which is based on a number of cells in the respective zone that are reported to be in the occupied state, and a number of the sensors in the respective zone that are in the reporting state. At least one predictive occupancy model is learned. The model is configured for predicting an occupancy of at least one of the zones. The learning is based on at least a portion of the received occupancy data. At least one of the predictive occupancy models includes a sensor noise model which assumes that a probability of a sensor being in the reporting state is dependent on whether the respective cell is in the occupied state.

In another aspect, an occupancy prediction system includes memory which receives occupancy data for each of a plurality of zones. Each zone includes a respective set of cells and a sensor for each of the cells in the set of cells. Each of the cells is in one of plurality of states at a time, the states including an occupied state and an unoccupied state. Each of the sensors is in one of a reporting state and a non-reporting state at a time. The occupancy data includes an observed occupancy, which is based on a number of cells in the respective zone that are reported to be in the occupied state, and a number of the sensors in the respective zone that are in the reporting state. At least one occupancy model is stored in memory, which is configured for predicting occupancy of at least one of the zones. The predicted occupancy of the at least one zone includes a predicted occupancy of cells in the at least one zone which have a sensor in the non-reporting state. Each of the at least one occupancy models is based on a demand model and a respective sensor noise model, at least one of the noise models assuming that a probability of a sensor being in the reporting state is dependent on whether the respective cell is in the occupied state.

In another aspect, a computer implemented method includes providing at least one occupancy model which is configured for predicting occupancy of at least one of a plurality of zones, each zone comprising a respective set of cells and including a sensor for each of the cells in the set of cells, each of the cells being in one of an occupied state and an unoccupied state at a time, each of the sensors being in one of a reporting state and a non-reporting state at a time. The predicted occupancy of the zone includes a predicted occupancy of cells in the at least one zone which have a sensor in the non-reporting state. Each of the at least one occupancy models is based on a demand model and a respective sensor noise model jointly learned from prior occupancy data. At least one of the noise models assumes that a probability of a sensor being in the reporting state is dependent on whether the respective cell is in the occupied state. Current occupancy data is received for at least one of the plurality of zones, the occupancy data including an observed occupancy, which is based on a number of cells in the respective zone that are reported to be in the occupied state and a number of the sensors in the respective zone that are in the reporting state, wherein at least one of the sensors is in the non-reporting state and the occupancy state of the at least one sensor in the non-reporting state is not known by the computer system. The method further includes predicting an occupancy of the at least one of the zones using at least one of the at least one occupancy models.

BRIEF DESCRIPTION OF THE DRAWINGS

FIG. 12 is a plot illustrating expected occupancy under Method 1, baseline model versus expected occupancy under Method 2, Version 2a.

DETAILED DESCRIPTION

The exemplary embodiment provides a solution to the problem of missing data from inoperative sensors by providing a probabilistic sensor noise model that can be combined with any probabilistic demand model. Using training data, the parameters in the demand and the sensor noise model can be learned at the same time. In one embodiment, a set of sensor noise models is generated, where each model is specifically tailored to particular sensor noise underlying causes, and thus the set of models is appropriate in several different settings. These may include settings where:

1. Sensors fail at random (independent of all other variables in the problem).
2. Sensors fail independently and identically distributed (iid) for spots that are full, and iid for spots that are empty, where the probability of failing can be different for the full and empty spots.
3. Sensors fail iid conditioned on spot status (empty or full), as for 2, and also time of day.
4. Sensors fail iid conditioned on spot status (empty or full), time of day, and location.
5. Sensors fail iid conditioned on spot status (empty or full), time of day, and latent type, where the latent type can be one of a finite set of two (or more) latent types.

Cross-validation allows for the selection of the appropriate model for a specific setting.

Figure 1:
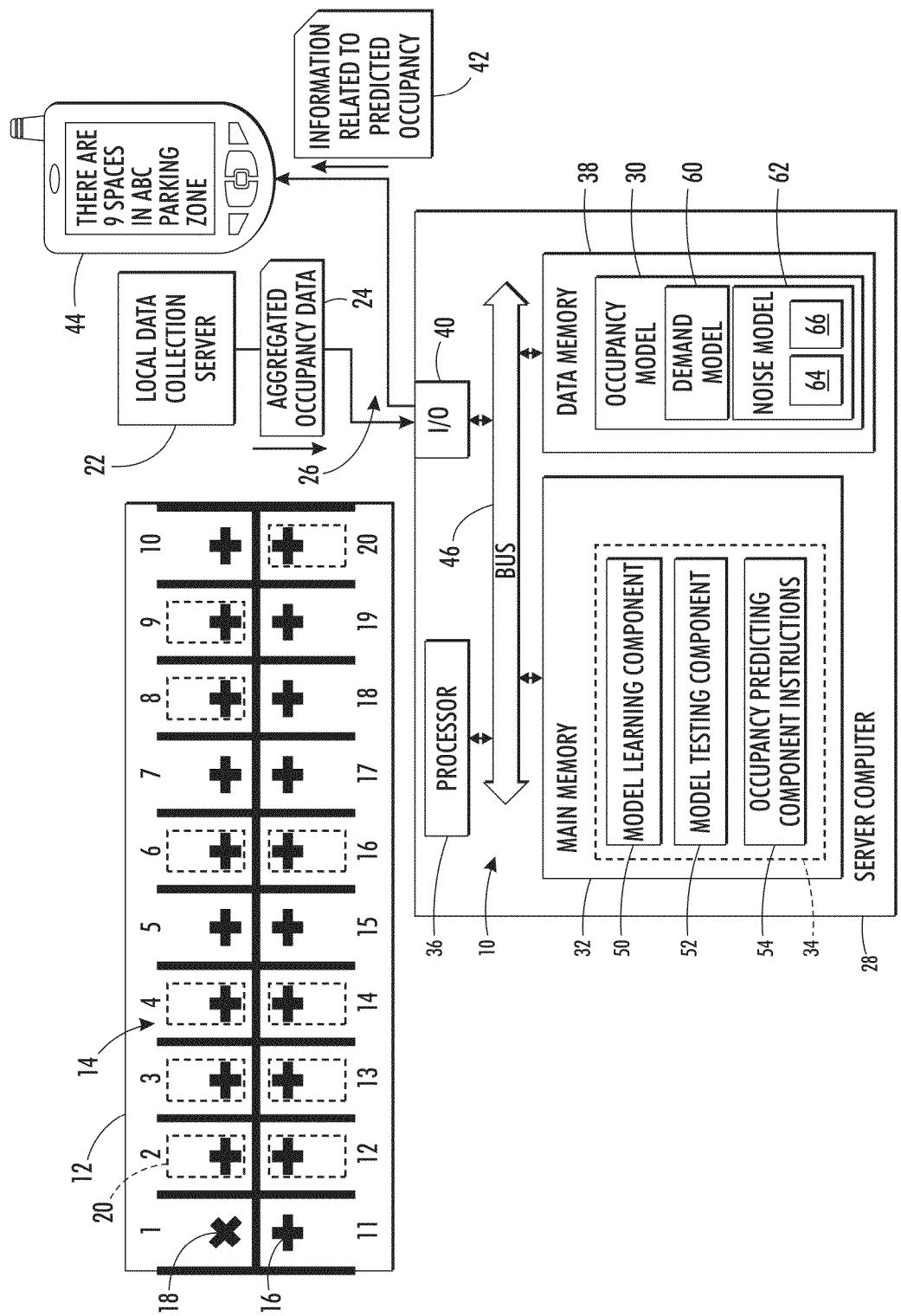
FIG. 1 is a functional block diagram of an environment in which an exemplary occupancy prediction system operates in accordance with one aspect of the exemplary embodiment.

With reference to FIG. 1, an example environment in which an exemplary occupancy prediction system 10 operates is shown.

A zone 12 includes a finite set of cells 14, each with a respective occupancy sensor 16, 18, etc. Some of the cells 14 are occupied by items 20. In the exemplary embodiment, the zone 12 is a parking zone and the cells 14 represent parking spaces, each of which is sized to receive a single vehicle 20, such as an automobile. The parking spaces may be delimited, for example with barriers, lines on the floor, or the like. As an example, the parking zone 12 may be a blockface used for on-street parking. In other embodiments, the parking zone 12 may include an indoor parking garage or a portion thereof.

In the exemplary embodiment, the distribution of the occupancy of a blockface 12 is invaluable to modeling of on-street parking. This distribution is not particularly simple. This is because the capacity of a blockface is limited, and the number of parking sensors that are working varies with time.

As will be appreciated, while only a single zone 12 is illustrated, a set of such zones 12 may exist in the exemplary operating environment, such as at least 2, or at least 10 zones and in some embodiments, up to 100, or up to 1000 or more zones. The zones may vary in the number of cells 14 that they each contain. For example, each of the zones 12 may have at least 2 cells, and at least some of the zones each have at least 5 or at least 10 cells, and in some embodiments, up to 100 or 100 cells.

Each of the parking spaces 14 is assumed to have only one of two occupancy states at any one time: occupied or non-occupied. Each of the sensors 16, 18 has only one of two operating states at any one time: reporting or non-reporting. The non-reporting sensors 18 (marked by an X) do not report the occupancy state of the respective parking space 14, while reporting sensors 16 (marked by a +) do report the occupancy state of the respective parking space. In the illustrated parking zone 12, there are eighteen reporting vehicle sensors 16 and two non-reporting vehicle sensors 18. For example, each vehicle sensor 16, 18 may include a magnetometer for detecting a vehicle occupying the parking space. To establish whether a vehicle is located above the sensor, thin-layer sensors which change their resistance directly under the influence of a magnetic field or Hall sensors may be used. Magnetometers of this type measure a change in the local magnetic field due to the presence of a vehicle.

The reporting sensors 16 report the occupancy state of the respective parking space to a common data collection device, such as a server computer 22, e.g. via wires and/or wirelessly. Non-reporting sensors 18 can be identified by the server computer 22 because their existence is known but no data is received from them. Aggregated data 24 is sent from the server 22 to the exemplary system 10, e.g., via a wired or wireless link 26, such as the Internet. As will be appreciated, the data 24 from the reporting sensors can be acquired by the system 10 in any suitable manner, such as from a website, from a memory storage device, or any other manner in which data can be acquired. In the exemplary embodiment, the aggregated data includes the number of working cells and the number of those which are occupied, for each zone for each of a plurality of times spaced throughout an extended time period, such as as a day/week. The system 10 may be hosted by one or more computing devices, such as the illustrated server computer 28.

The system 10 includes a model 30 which is/has been trained to predict the occupancy of the zone 12, or a set of such zones, at a given time, based on acquired current occupancy data and previously acquired training occupancy data (collectively referred to as data 24), but not on any actual data concerning the occupancy of parking spaces 14 having non-reporting sensors. The model 30 may assume that the parking spaces 14 with non-reporting sensors 18 have a probability of being occupied by a vehicle 20 which is not necessarily the same as the probability of being occupied for the parking spaces having reporting sensors 16, and which in some embodiments, that probability may vary throughout the day, and/or at different zone locations, or the like. Each sensor 16, 18 has a chance of being a reporting sensor at some times during the day and a non-reporting at other times.

The exemplary system 10 includes memory 32 which stores instructions 34 for performing the exemplary method disclosed herein and a processor 36, in communication with the memory, for executing the instructions. The exemplary model 30 is stored in memory of the system, such as in data memory 38. An input/output device 40, such as a modem, allows the system 10 to communicate with external devices, such as the exemplary data collection server 22, and to output information 42, such as predicted occupancy (or its complement, availability), directly or indirectly to an output device 44, such as a parking space display device, a data storage device, a printer, a smartphone, another application which uses the data, or the like. Hardware components of the system 10 communicate via a data/control bus 46.

The exemplary instructions 34 may include a model learning component 50, for learning parameters of the occupancy model, based on a training portion of the dataset 24, a model testing component 52 for testing two or more of the learned occupancy models on a testing set of the data 24 to identify a model which best fits the data, and an occupancy prediction component 56, which receives new occupancy data an predicts a current occupancy of at least one of the zones using the model.

The system 10 may report, as information 42, the number of parking spaces that are known to be occupied/available (based on the data from the working sensors) as well as the predicted number of occupied/available parking spaces, based on the model 30.

Occupancy, as used herein, refers to the number of spaces in a zone which are occupied (an integer). "Reported (or observed) occupancy" refers to the occupancy of a zone 12, as reported by the collection server 22, based on the information from the working sensors 16. Reported occupancy would be 10 in the illustrated zone in FIG. 1. "Predicted (or inferred) occupancy" (an integer) refers to the occupancy predicted by the system 10 using the model 30. This will be at least 10 and may be up to 12 in the illustrated zone in FIG. 1, since the model 30 will not add to the reported occupancy of 10 more than the number (2) of non-reporting cells. "Actual occupancy" (an integer) refers to the actual occupancy of a zone 12. This is 11 in the illustrated zone in FIG. 1. This number is generally not known by the system 10 at any time, unless, of course, all cells happen to have reporting sensors 16. In the exemplary embodiment, at least some of the zones 12 whose data is aggregated and used by the system 10 have at least one non-reporting sensor in at least one reporting period, and generally in multiple reporting periods. The number of reporting sensors 16 in a zone may vary throughout the data collection period, such as over the course of at least a few hours or a day or a week. "Capacity" refers to the total number of spaces 14 in a zone 12. Capacity is 20 in the illustrated zone in FIG. 1. This number is generally assumed to remain fixed during the data collection period. Zones for which capacity varies, e.g., from one day to the next, may be omitted from the training data.

The system 10 may be used in a multi-zone parking system enabling drivers to be directed to parking zones 12 where spaces are still available and avoid unnecessary wastage of time and fuel while drivers search for available spaces. The information 42 output by the system may also be informative to city planners in determining where to situate parking zones. In another embodiment, the system feeds information 42 to a parking fee setting system hosted by server 28 or by a separate computing device. The information 42, in this case, may be used for setting parking fees which are at least partially selected to influence the behavior of drivers so that demand more closely matches availability and/or to meet at least one other occupancy-based criterion. Another use for the information 42 is in parking ticket enforcement. For example, if fewer parking tickets have been purchased in a zone 12 than the predicted occupancy, an alert could be issued. Parking attendants could then be directed to check the parking spaces where there are non-reporting sensors in addition to the parking spaces with a reporting sensor for which no ticket has been purchased, and take the appropriate enforcement action.

The output data 42 from the system may also be used to evaluate the causes of failure of the sensors 16, 18. For example, failure hypotheses may be developed as to the cause of failure of the sensors and the data output by the system may be used to identify the failure hypotheses which best fit the data. For example, one failure hypothesis may predict that sensors fail due to vibrations of traffic driving by and that this is more likely when the space is empty. If the output data 42 from the system predicts lower occupancy for the non-reporting sensors than would be expected based on the reporting sensors early in the day when traffic is beginning to build up but there are still a lot of empty spaces in the parking lot, this could lend support to this hypothesis. The existing sensors could then be modified or new sensors designed which would make them less sensitive to traffic vibrations. It has been found in one case that sensors are more likely to fail for empty spots, in particular during busy traffic periods. Compared to baseline methods based on a missing-at-random assumption, the present method gives better predictive performance and avoids a systematic bias in the inferred occupancies.

While the exemplary parking occupancy problem is a specific case, the problem can be more generally described as the problem of predicting the number of cells (bits) in a set to be ON (e.g., the number of parking spaces which are considered to be occupied), where the measurements of the individual bits can be missing from some of the samples. These missing values need not be missing at random, the exact process behind it being unknown at the outset.

As an example an entry in a data stream 24 may read: "at time t, blockface i (e.g., zone 12), which has capacity 20, has 18 working vehicle sensors 16, and of those working sensors, 10 indicate a full parking space." A challenge is to infer as accurately as possible what the actual occupancy is, of all spaces, not just those with working sensors. The fact that the sensors 16, 18 fail only occasionally enables a demand model 60 and a sensor noise model 62 to be learned jointly, and then to use this joint model 30 to "fill in the blanks" in the best possible way.

The sensor noise model 62 can be of various types. Several noise models are provided by way of example. In one embodiment, the noise model 62 comprises a plurality of noise models 64, 66, etc., which can be tested on a testing data set 24 to identify an appropriate one of the models which best fits the data. The appropriate noise model 64, 66, for a given situation may depend on the sensor failure characteristics. The example noise models 62 described below are of increasing complexity. Cross-validation allows the selection of a suitable one of the models 64, 66 for a particular application. The example sensor noise models are flexible and can be combined with any probabilistic demand model 60 and hence have a very wide applicability.

The computer-implemented system 10 may be embodied in a PC, such as a desktop, a laptop, palmtop computer, portable digital assistant (PDA), server computer, cellular telephone, tablet computer, pager, combination thereof, or other computing device capable of executing instructions for performing the exemplary method.

The memory 32, 38 may represent any type of non-transitory computer readable medium such as random access memory (RAM), read only memory (ROM), magnetic disk or tape, optical disk, flash memory, or holographic memory. In one embodiment, the memory 32, 38 comprises a combination of random access memory and read only memory. In some embodiments, the processor 36 and memory 32 and/or 38 may be combined in a single chip. The network interface 40 allows the computer to communicate with other devices via a computer network, such as a local area network (LAN) or wide area network (WAN), or the internet, and may comprise a modulator/demodulator (MODEM).

The digital processor 36 can be variously embodied, such as by a single-core processor, a dual-core processor (or more generally by a multiple-core processor), a digital processor and cooperating math coprocessor, a digital controller, or the like. The exemplary digital processor 36, in addition to controlling the operation of the computer 28, executes instructions stored in memory 32 for performing the method outlined in FIG. 2.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 1 is a high level functional block diagram of only a portion of the components which are incorporated into a computer system 10. Since the configuration and operation of programmable computers are well known, they will not be described further.

Figure 2:
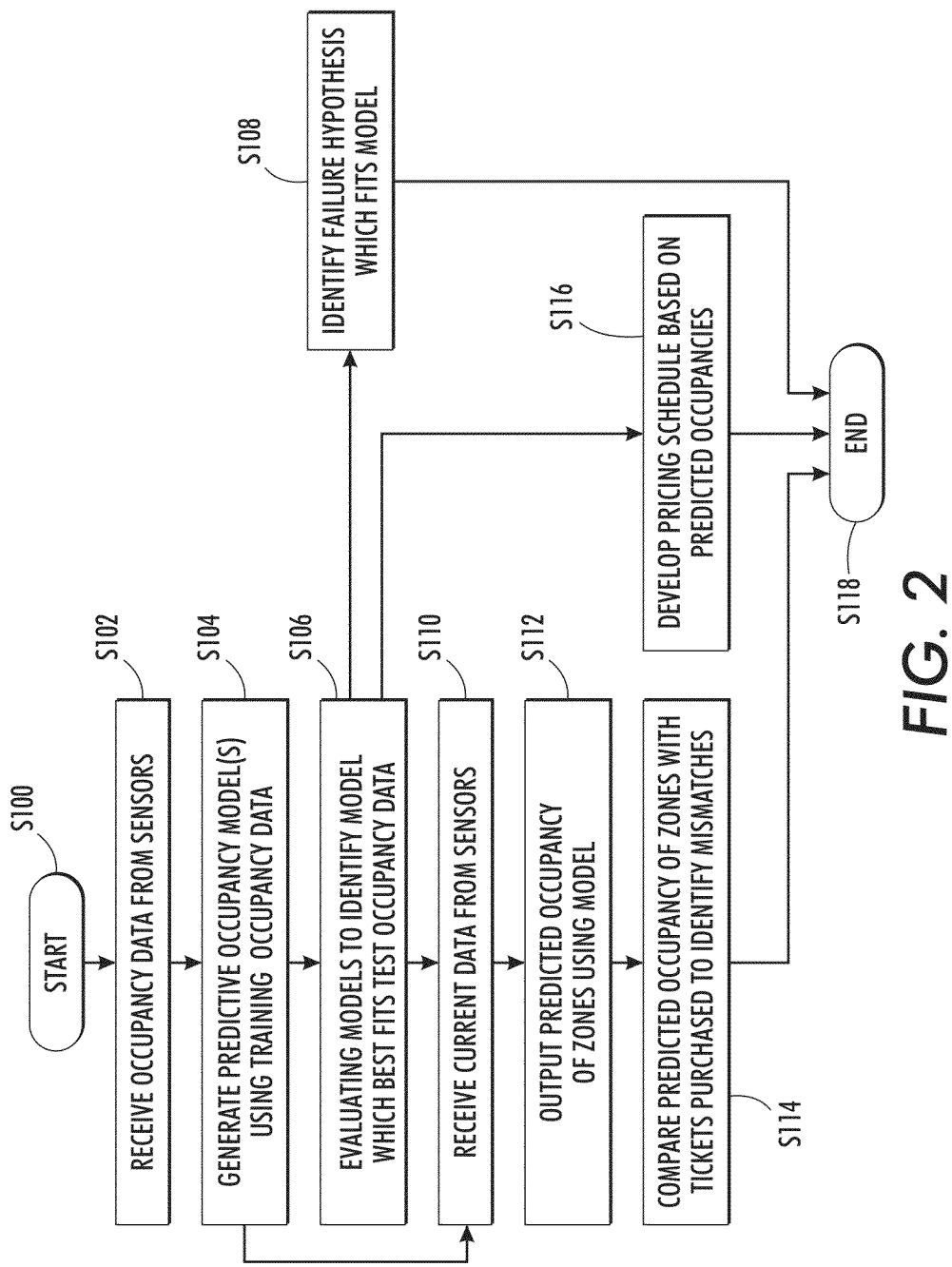
FIG. 2 is a flowchart which illustrates a method for generating and using an occupancy prediction system.

FIG. 2 illustrates an exemplary method for generating an occupancy prediction model 30 and using the model in various applications. The method begins at S100.

At S102, occupancy data 24 (training data) is acquired from a set of zones 12. Each item of data may include a timestamp indicating the time at which the data was acquired (such as the day and hour/minutes); and for each zone, a zone identifier, such as an alphanumeric code; the zone capacity (total number of cells—alternatively, this could be obtained from a look up table); the number of cells which are reporting (i.e., operational, or not reporting-not operational); and the number of reporting cells which are ON (occupied, or alternatively, unoccupied). In the exemplary method, data is not available per individual sensor, but is aggregated per zone 12. The data is stored in memory 38 during processing.

At S104, at least one occupancy model 30 is learned (with model learning component 50) using at least a portion of the acquired occupancy data 24. The occupancy model 30 assumes that the actual occupancy of each zone 12 (or a set of the zones) has a probability distribution which is a function of the capacity of the zone and an occupancy rate, which may be assumed to be a function of time, such as a time of day and/or day of the week. In the case of a parking zone for example, the zone may be empty or almost empty at some times of the day and at full capacity at other times of the day. Various other assumptions may be incorporated into the model 30, such as location. The learning of the occupancy model proceeds without the system 10 knowing the occupancy state of any the non-reporting sensors.

In the exemplary embodiment, a stochastic gradient descent method is used to learn the parameters of the model 30, such as the occupancy rate at a given time. In particular, a maximum likelihood estimation of the adjustable parameters of a generative model (the occupancy model) of the aggregated data 24 and missing data is performed by a gradient descent method on the negative log-likelihood. This is a standard statistical modeling procedure. In the present method it finds those settings for the parameters that make the observed data most likely to be generated. However, other iterative learning methods may alternatively be used to progressively refine the model, such as expectation maximization.

At S106, if more than one occupancy model 30 is learned, one of the models may be selected. For example, occupancy models 30 incorporating different noise models 64, 66 are tested on a remaining set of the data (e.g., by cross-validation) to identify which model best fits the data (with model testing component 52). The selected model is stored in memory and/or output.

Once the model parameters have been learnt (S104) and tested on the training data (S106), the model learning and model testing components 50, 52 may be omitted from the system.

Various uses for the occupancy model 30 are illustrated by way of example.

For example, at S108, the model assumptions are compared with hypotheses for failure of the sensors to identify a hypothesis or hypotheses which is/are compatible with the assumptions (e.g., with model testing component 52).

In one embodiment, at S110, current data 24 is received from the sensors/collection server 22 in a format analogous to the data used in learning the model, which can be for just a single time period and a single zone or for multiple zones. The current data is input to the learned model 30 and at S112, the model predicts the occupancy of at least one zone 12, e.g., each zone, or a set of zones, based on the current data (e.g., with the occupancy predicting component 54). The method permits prediction of the occupancy status of at least one zone when at least one of the sensors in the zone is in the non-reporting state and when the current occupancy state of those sensors in the non-reporting state is not known by the computer system. The prediction is obtained by considering all possible numbers of empty spaces among the non-operating sensors and reporting the number that is most likely under the fitted model.

The predicted occupancy information 42, or information based thereon, may be output to an output device 44.

In one embodiment, the predicted occupancy of a zone that is output at S112 is compared with other occupancy-related data to determine if there is a mismatch (S114). For example, if the number of parking tickets purchased for the zone 12 is fewer than the predicted occupancy at a given time, this suggests that for some of the vehicles in the zone no parking ticket has been obtained or payment received by other payment method, such as a monthly pass.

In another embodiment, the predicted occupancy data 42 is used to generate a pricing schedule for one or more of the zones 12 which is based at least in part on the predicted occupancy, e.g., for a given time of day (S116). This step may, of course, utilize the historical data received at S102 in generating the predicted occupancy for discrete time periods, such as hours or portions of the day, and for different days of the week, month, and/or year. A pricing schedule generation component may be used for this purpose.

The method ends at S118.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the exemplary method.

Various aspects of the system and method will now be described.

Learning the Occupancy Model

The parameters of the occupancy model 30 are learned during the training phase (S104) using a demand model 60 to predict the demand for spaces and a sensor noise model 62 to predict the difference in behavior of operational and non-operational sensors, which may be jointly learned.

A. The Demand Model

The actual occupancy X of a zone 12, such as a blockface, with capacity A can be assumed to have a known type of demand distribution, such as a truncated Poisson distribution, for some occupancy rate $\lambda \in \mathbb{R}_+$, where $\mathbb{R}_+$ represents the set of positive real numbers. The distribution is truncated because the blockface 12 has a fixed capacity A and so there can be no probability of an actual occupancy X occurring which exceeds the capacity, even when there are vehicles seeking to park there. The "occupancy rate" $\lambda$ refers to the level of interest in parking in a blockface and corresponds to the expected (mean) number of occupied spaces 14. Where $\lambda$ is small, the actual occupancy X of the block face is likely to be small and if $\lambda$ is larger, the actual occupancy X of the block face is likely to be nearly or completely at the capacity A. In the case of a Poisson distribution, the probability $\mathbb{P}$ of the actual occupancy X, given the capacity A and rate $\lambda$ can be described by the expression:

$$\mathbb{P}(X \mid A, \lambda) := \frac{\lambda^X}{Z(\lambda, A) X!} \quad (1)$$

$$(X \in \{0, 1, \ldots, A\})$$

where X! is factorial X and
$Z(\lambda,A)$ is a normalizing factor:

$$Z(\lambda, A) = \sum_{j=0}^{A} \frac{\lambda^j}{j!} \quad (2)$$

Equation 1 thus expresses that the probability of observing X is a function of $\lambda$ and X for all values of X from 0 to A. The normalizing factor allows for blockfaces of different capacities to be considered in the model. If all zones are the same size, normalization may be omitted.

The above probability distribution of occupancy X is the basis of demand model 60. In general, $\lambda$ has a value >0. This value is learned in the learning phase.

B. The Noise Model

Another problem is to explain the distribution of the observed occupancy Y, given that only B out of the A sensors are actually working, (i.e., when B can be less than A). This is the function of the noise model 62. Noise can be addressed under different hypotheses.

The noise model 62 assumes that the actual occupancy X can differ from what would be predicted based on the observed occupancy Y. In particular, it is assumed that the observed occupancy Y depends on at least one factor selected from:

a) the probability of a sensor 16, 18 being inoperative (or operative) is assumed to be independent of whether a cell 14 is occupied or empty and therefore that working sensors 16 are chosen independently of whether the spaces are occupied. In this noise model, the probability of observing occupied spots from working sensors 16 is assumed to be a function of the capacity A, how many sensors are working B, and the parameter $\lambda$. The probability distribution of observing occupied spots can be assumed to be a function of a sum, over all possible true occupancies (i.e., between a minimum value Y and a maximum value (A−B+Y)), of the likelihood of observing Y, which may be assumed to be a function of the rate $\lambda$ (as a function of X) and the values of Y, A, and B.

b) the probability of a sensor being inoperative is assumed to be dependent on whether a spot is occupied or empty. In this noise model, it is assumed that a first probability distribution of observing occupied spots from working sensors can be defined for the occupied spaces and a second probability distribution can be defined for the unoccupied spaces, which is permitted to be different from the first distribution.

c) the probability of a sensor being inoperative is dependent on a time parameter, such as time of day or day of the week. In this model, a different probability distribution of observing occupied spots from working sensors can be permitted for each of a set of different time parameters.

d) the probability of a sensor being inoperative is dependent on a location of the zone, selected from a set of zone locations. In this noise model, a different probability distribution of observing occupied spots from working sensors is permitted for each of a set of zone locations.

e) the probability of a sensor being inoperative is dependent on a latent type (e.g., other than time and zone location). In this noise model, a different probability distribution of observing occupied spots from working sensors is permitted for each of a set of latent types. Zones are automatically assigned to one of the latent types in the learning phase of the method.

The above noise models may be used singly or in combination, examples of which are discussed below.

In a first approach (Method 1), the sensor noise model 62 assumes that the B working sensors are chosen independently of whether the spaces are occupied. In the second approach (Method 2), it is assumed that the probability of a particular sensor working depends on whether the corresponding parking space is occupied or not.

Given a noise model, a likelihood function based on the respective probability distribution(s) can be optimized, based on the acquired data, for estimation of the parameter $\lambda$. As will be appreciated, in various models, this can include computing a respective value of $\lambda$ for each of a plurality of times, or for each of a plurality of zone locations, or for each of a plurality of latent parameters, or for a combination thereof.

In the following, the terms "optimization," "minimization," and similar phraseology are to be broadly construed as one of ordinary skill in the art would understand these terms. For example, these terms are not to be construed as being limited to the absolute global optimum value, absolute global minimum, and so forth. For example, minimization of a function may employ an iterative minimization algorithm that terminates at a stopping criterion before an absolute minimum is reached. It is also contemplated for the optimum or minimum value to be a local optimum or local minimum value.

1. Method 1

This approach assumes that the B working sensors are chosen independently of whether the spaces are occupied. The problem may be formulated more clearly in terms of the uniform distribution $\mathcal{U}_{x,n}$ on vectors which describe the occupancy of each of the cells in a zone:

$$\{v | v \in \{0,1\}^n, l_n \cdot v = x\}$$

where $l_n$ is the n-dimensional all-ones vector.

Each possible vector v can thus represent the occupancy of n spaces in a parking zone, where each element of the vector can be zero (in the case of an empty space) or 1 (in the case of an occupied space). The inner product · here is a shorthand notation for summing the number of occupied spaces and this representation therefore denotes the set of ways of assigning 0 and 1 to a zone, such that the sum of occupied spaces in the zone is x.

1.1 Method 1, Version 1 (Baseline)

Suppose $a \sim \mathcal{U}_{X,A}$ and $b \sim \mathcal{U}_{B,A}$ for some $A, B \in \mathbb{Z}_+$ with $A \geq B$, where X has a truncated Poisson distribution, with maximal value A for some rate $\lambda \in \mathbb{R}_+$. This corresponds to the parking case, where the number B of working sensors cannot exceed the total number of sensors A and each parking space has exactly one sensor, so the maximal value of the Poisson distribution corresponds to the total number of sensors A. Then the inner product $Y := a \cdot b$ has the distribution:

$$\mathbb{P}(Y | A, B, \lambda) = \frac{q(Y)}{\sum_{Y=0}^{B} q(Y)}, \quad (3)$$

$(Y \in \{0, 1, \ldots, B\})$ where:

$$q(Y) := \frac{1}{Y!} \sum_{X=Y}^{A-B+Y} \lambda^X \frac{(A-X)!}{(X-Y)!(A-B-X+Y)!(B-Y)!}. \quad (4)$$

As above, the probability $\mathbb{P}(Y|A,B,X)$, which is the probability of observing Y reporting sensors in an occupied state, given the known capacity A, the known number of working sensors B, and some rate $\lambda$, which is to be determined in the learning phase, obeys a truncated Poisson distribution and is thus a function of A, B, and $\lambda$, as well as Y.

While not essential for understanding the exemplary embodiment, the following proof is provided.

First, $\mathbb{P}(Y|A,B,X)$ has a hypergeometric distribution as Y (the observed occupancy) is the number of occupied spaces drawn when drawing B spaces without replacement from a block face containing A spaces of which X are occupied and A–X are unoccupied. Thus:

$$\mathbb{P}(Y|A,B,X) = \frac{\binom{X}{Y}\binom{A-X}{B-Y}}{\binom{A}{B}} \quad (5)$$

$(Y \in \{(B-A+X)^+, \ldots, \min\{B, X\}\}).$

Now, marginalize over X using the fact that it has a truncated Poisson distribution and that:

$$Y \leq \min\{B,X\} \Rightarrow X \geq Y \text{ and } Y \geq (B-A+X)^+ \Rightarrow X \leq A-B+Y. \quad (6)$$

This gives:

$$\mathbb{P}(Y|A,B,\lambda) = \sum_{X=0}^{A} \mathbb{P}(X|A,\lambda)\mathbb{P}(Y|A,B,X) \quad (7)$$

$$= \frac{1}{Q(\lambda,B)} \sum_{X=Y}^{A-B+Y} \frac{\lambda^X}{X!} \binom{X}{Y}\binom{A-X}{B-Y} \quad (8)$$

$$= \frac{1}{Q(\lambda,B)Y!(B-Y)!} \sum_{X=Y}^{A-B+Y} \lambda^X \frac{(A-X)!}{(X-Y)!(A-B-X+Y)!}. \quad (9)$$

where, for appropriate normalization:

$$Q(\lambda, B) = \sum_{Y=0}^{B} \frac{1}{Y!(B-Y)!} \sum_{X=Y}^{A-B+Y} \lambda^X \frac{(A-X)!}{(X-Y)!(A-B-X+Y)!}.$$

This completes the proof.

Likelihood in Method 1, Version 1

The next step, given the probability distributions above for the demand and noise models, is to learn the parameters of the model ($\lambda$ in this case) given the acquired data 24. This can include learning a value of λ for each of a plurality of times and for each of a plurality of zone locations, by a maximum likelihood estimation method.

Suppose that N comparable observations are provided (i.e., t represents a particular day of the week and particular time of day) for M parking blockfaces. These observations can be described as: $D_t=\{(y_m(n),B_m(n)), m=1,\ldots, M, n=1,\ldots, N\}$, where $y_m(n)$ denotes the $n^{th}$ observation of the $m^{th}$ blockface occupancy (i.e., an instance corresponding to Y above) and $B_m(n)$ represents the $n^{th}$ observation of the number of working sensors at $m^{th}$ blockface. The system is also provided with the actual blockface capacities: $\{A_m\}_{m=1}^M$.

For example, the system 10 could consider parking observations for N Thursdays at the start of each hour over a period of 24 hours. In this case, the system would have 24 data sets ($D_t$, t=1, ..., 24) times N. As will be appreciated, models may be separately learned, in this way, for each day of the week or could be learned collectively, e.g., for weekdays (one model for the working week) and weekends (e.g., one model covering both Saturday and Sunday). Models may also be separately learned for holidays and other days of the year which are potentially different in their probability distributions.

The object of the learning phase (S104) is to learn the hyperparameters $\lambda_m(t)$, m=1,...,M, t=1,...,24 of the model 30 that are used for occupancy predictions at the M blockfaces. The likelihood of observing one of the N datasets at hour t can be described by a likelihood function which is a product over all values of N and all values of M of the probability of observing the observation $y_m(n)$:

$$p(D_t | \lambda) = \prod_{n=1}^{N} \prod_{m=1}^{M} \mathbb{P}(y_m(n) | A_m, B_m(n), \lambda_m(t)) \quad (10)$$

$$= \prod_{n=1}^{N} \prod_{m=1}^{M} \frac{((B_m(n) - y_m(n))!)^{-1}}{Q(\lambda_m(t), B_m(n))y_m(n)!}$$

$$\sum_{x=y_m(n)}^{A_m-B_m(n)+y_m(n)} \frac{\lambda_m(t)^x (A_m - x)!}{(x - y_m(n))!(A_m - B_m(n) - x + y_m(n))!}$$

where $Q(\lambda_m(t),B_m(n))$ is a normalizing constant x represents the actual number of occupied spaces A good property of the likelihood function is that is has an unique global minimum with respect to λ. Also, it is not concave in the parameter λ, but is concave in the log of the parameter λ.

The maximum likelihood estimation of parameters $\lambda_m(t)$, m=1, ..., M for a specific hour t can be found by optimizing (e.g., maximizing) the log-likelihood function $L_t=\log(p(D_t|\lambda))$. Various methods are contemplated for maximizing this function. In one embodiment, maximization is performed with an iterative approach, such as a gradient descent method. This facilitates making online updates of the model parameters as more, comparable observations become available. The optimization is subject to one or more constraints. For example, there may be a requirement that each value of λ in the optimized log likelihood function be a positive real number (i.e., $\lambda_m(t) \in \mathbb{R}_+$, m=1, ..., M, t=1, ..., 24) and thus the method has to guarantee that all $\lambda_m(t)$ are positive. In this setting, learning becomes a constrained optimization problem. Since gradient ascent cannot be directly applied to a constrained optimization problem, the original constrained optimization problem can be transformed to a new optimization problem which is unconstrained by a one-to-one mapping from [0,1] onto $\mathbb{R}$. This gradient ascent approach is expected to provide performance here, since the constraints are not expected to be active for this application.

The gradient ascent method iteratively modifies the rate λ (or specifically, the log of the rate) as a function of a learning rate such that at convergence, the found parameters are a (local) maximum of the log-likelihood.

Thus, in one embodiment, the method minimizes the negative log-likelihood $L_t$ with respect to $\log(\lambda_m(t))$ instead of $\lambda_m(t)$, where $\partial L_t/\partial \log(\lambda_m(t))$ is simply $\lambda_m(t) \cdot \partial L_t/\partial \lambda_m(t)$. This converts the problem into an unconstrained optimization, which can now be solved using a gradient ascent approach. The summary of the resulting learning rule in the stochastic mode is given as follows:

$$\log(\lambda_m(t)^{new}) = \log(\lambda_m(t)^{old}) + \quad (11)$$

$$\alpha(n) \left( \frac{\sum_{x=y_m(n)}^{A_m-B_m(n)+y_m(n)} \frac{x \lambda_m(t)^x (A_m - x)!}{(x - y_m(n))!(A_m - B_m(n) - x + y_m(n))!}}{\sum_{x=y_m(n)}^{A_m-B_m(n)+y_m(n)} \frac{\lambda_m(t)^x (A_m - x)!}{(x - y_m(n))!(A_m - B_m(n) - x + y_m(n))!}} - \frac{\Delta \lambda Q(\lambda_m(t), B_m(n))}{Q(\lambda_m(t), B_m(n))} \right),$$

where $\alpha(n)$ is the learning rate, which can be a fixed parameter or one which progressively varies. More advanced scalings, e.g., based on Newton's method, could also be used.

$\nabla_\lambda Q(\lambda_m(t),B_m(n))$ represents the gradient of Q, i.e., the vector of partial derivatives of Q with respect to A.

1.2 Method 1, Version 2: Approximation

The above solution (Method 1, Version 1) involves time consuming computations (of $Q(\lambda_m)(t),B_m(n))$, factorial terms, etc.) after observing each new example. Recalculating all the update terms upon re-viewing the training data and upon changes in λ can put a burden on the computational resources. As a result, for some applications, a less time consuming approximation to the original solution can be derived.

One example of such an approximation follows, which takes the form of a similar, but simpler model for the sensor noise.

Since the actual occupancy X of a blockface with capacity A has a truncated Poisson distribution (1) with rate λ, it can be assumed that the same holds for the observed occupancy Y with rate $$\lambda \frac{B}{A}$$

so that:

$$\mathbb{P}(Y | A, B, \lambda) := \frac{\left(\lambda \frac{B}{A}\right)^Y}{Z(\lambda, A, B) Y!} \quad (12)$$

$$(Y \in \{0, 1, \ldots, B\}),$$

where $Z(\lambda,A,B)$ is a normalizing factor:

$$Z(\lambda, A, B) = \sum_{j=0}^{B} \frac{\left(\lambda \frac{B}{A}\right)^j}{j!}.$$

Now, the log likelihood is simply:

$$L_t = \sum_{n=1}^{N} \sum_{m=1}^{M} \log(Z(\lambda_m, A_m, B_m(n))) + \qquad(14)$$
$$\log(y_m(n)!) + y_m(n)(\log(A_m) - \log(B_m(n)) - \log(\lambda_m)),$$

and the learning rule is:

$$\log(\lambda_m(t)^{new}) = \qquad(15)$$
$$\log(\lambda(t)^{old}) + \alpha(n)\lambda_m(t)\left(\frac{y_m(n)}{\lambda_m(t)} - \frac{\nabla_\lambda Z(\lambda_m(t), A_m, B_m(n))}{Z(\lambda_m(t), A_m, B_m(n))}\right),$$

where $\alpha(n)$ is the learning rate and $\nabla_\lambda Z(\lambda_m(t),A_m,B_m(n))$ represents the gradient of Z, i.e., the vector of partial derivatives of Z with respect to $\lambda$.

2. Method 2

In the second approach, Method 2, it is assumed that the probability of a particular sensor working depends on whether the corresponding parking space is occupied or not. Let $\pi_f$ be the probability that the parking sensor is working if the parking space is full (occupied) and $\pi_e$ be the probability that the parking sensor is working if the parking space is empty (unoccupied). (As will be appreciated, Method 1 could be generated by Method 2 using $\pi_f = \pi_e = \pi$).

Furthermore, it can be assumed that probability parameters $\pi_f$ and $\pi_e$ are a characteristic of the sensors in general, meaning that they are simply manufactured with such flow behavior, or a characteristic of the wireless sensor network, meaning that there is a certain packet loss rate that depends on whether the parking space is occupied. Both of these assumptions correspond to tying $\pi_f$ and $\pi_e$ across all M blockfaces and all times (24 hours), i.e., the values of $\pi_f$ and $\pi_e$, are independent of time and blockface.

In another embodiment, it is assumed that $\pi_f$ and $\pi_e$ are also chosen separately for different times (e.g., times of day and/or week), e.g., $\pi_f(t), \pi_e(t), t=1, \ldots, 24$, although smaller or larger increments of time t could be considered, such as: early morning, morning rush hour, midday, evening rush hour, late evening. This approach is compatible with the assumption that these parameters are traffic dependent.

In the extreme case, the probability parameters for each blockface could also be assigned separately: $\pi_f(m,t), \pi_e(m,t)$, $t=1, \ldots, 24$, $m=1, \ldots, M$. However, this may significantly increase the number of parameters and lead to poor generalization. In some embodiments, however, blockfaces could be grouped into predefined clusters, of for example, 50 or more parking spaces, and parameters assigned to each cluster of blockfaces. In other embodiments, a mixture model approach may be used which automatically assigns blockfaces to a respective one of two (or more) groups (the group assigned being the one which the data fits best in computing the log likelihood).

The starting point in the design of the method under Method 2 is to introduce the probability $\mathbb{P}(X,Y,B|\lambda,A,\pi_f,\pi_e)$ as a dot product of a demand model and a noise model:

$$\mathbb{P}(X,Y,B|\lambda,A,\pi_f,\pi_e) = \mathbb{P}(Y,B|X,A,\pi_f,\lambda_e) \cdot \mathbb{P}(X|A,\lambda), \qquad(16)$$

where $\mathbb{P}(X|A,\lambda)$ is the demand model 60 probability, which can be a Poisson distribution as given by Eqn. (1) above, and $\mathbb{P}(Y,B|X,A,\pi_e,\pi_f)$ is the noise model probability, which here is the probability of observing occupancy Y and having B sensors working, which is a function of $\pi_f$ and $\pi_e$ as well as A and X. The noise model probability can be defined as:

$$\mathbb{P}(Y, B | \lambda, A, \pi_f, \pi_e) = \qquad(17)$$
$$(1-\pi_f)^{X-Y} \cdot \pi_f^Y \cdot (1-\pi_e)^{A-X+Y-B} \cdot \pi_e^{B-Y} \cdot \binom{X}{Y}\binom{A-X}{B-Y}.$$

Using marginalization, the X variable can be summed out to obtain the solution for $\mathbb{P}(Y,B|\lambda,A,\pi_f,\pi_f)$ as:

$$\mathbb{P}(Y, B | \lambda, A, \pi_f, \pi_e) = \sum_{X=Y}^{A-B+Y} \frac{\lambda^X}{Z(\lambda, A)X!} \qquad(18)$$
$$(1-\pi_f)^{X-Y} \cdot \pi_f^Y \cdot (1-\pi_e)^{A-X+Y-B} \cdot \pi_e^{B-Y} \cdot \binom{X}{Y}\binom{A-X}{B-Y}.$$

Likelihood estimations are given for various possible cases below.

2.1 Method 2, Version 1

In this version of Method 2, probability parameters $\pi_f$ and $\pi_e$ are independent of time and location, i.e., are tied across all sensors and hours.

Such a model may be used to test a first assumption on $\pi_f$ and $\pi_e$, i.e., that they are attributes of the system in general.

The following likelihood can be defined for this case:

$$p(D | \lambda, \pi_f, \pi_e) = \qquad(19)$$
$$\prod_{t=1}^{24} \prod_{n=1}^{N} \prod_{m=1}^{M} \mathbb{P}(y_m(n, t), B_m(n, t) | \lambda_m(t), A_m, \pi_f, \pi_e) =$$
$$\prod_{t=1}^{24} \prod_{n=1}^{N} \prod_{m=1}^{M} \frac{\pi_f^{y_m(n,t)} \pi_e^{(B_m(n,t)-y_m(n,t))}}{Z(\lambda_m(t), A_m)(B_m(n,t) - y_m(n,t))! y_m(n,t)!}$$
$$\sum_{x=y_m(n,t)}^{A_m - B_m(n,t) + y_m(n,t)} \frac{\lambda^x (A_m - x)!}{(x - y_m(n,t))!} \cdot \cdot$$
$$\frac{(1-\pi_f)^{x-y_m(n,t)}(1-\pi_e)^{A_m-x+y_m(n,t)-B_m(n,t)}}{(A_m - x + y_m(n,t) - B_m(n,t))!},$$

The maximum likelihood estimates of parameters $\lambda_m(t)$, $m=1, \ldots, M$, $\pi_f, \pi_e$ can then be found, in a similar manner to that described above, by maximizing the log-likelihood function $L=\log(p(D|\lambda,\pi_f,\pi_e))$.

Once again, the stochastic gradient descent method can be used to obtain the learning rules. In addition to $\lambda_m(t)$ having to be strictly positive, parameters $\pi_f, \pi_e$ are constrained to an interval [0,1], i.e., $\pi_f$ and $\pi_e$ can independently have a real value which is >0 and <1.

For this reason, the method minimizes the negative log-likelihood L with respect to $\log(\lambda_m(t))$, $\log(\pi_f/(1-\pi_f))$ and $\log(\pi_e/(1-\pi_e))$ instead of $\lambda_m(t), \pi_f$ and $\pi_e$, where $\partial L/\partial \log(\pi_f/(1-\pi_f))$ is simply $(\pi_f-\pi_f^2)\cdot\partial L/\partial\pi_f$. This converts the problem into unconstrained optimization, which can now be solved using the gradient ascent approach. After the $n^{th}$ data point at the $t^{th}$ hour is observed, the $\lambda_m(t)$ parameters corresponding to that hour can be updated as:

$$\log(\lambda_m(t)^{new}) = \tag{20}$$

$$\log(\lambda_m(t)^{old}) - \frac{\alpha(n)}{G(n,m,t)} \cdot \left( \sum_{x=y_m(n,t)}^{A_m-B_m(n,t)+y_m(n,t)} \frac{\nabla_\lambda Z(\lambda_m(t), A_m)}{Z(\lambda_m(t), A_m)} - \frac{x\lambda_m(t)^x(A_m-x)!(1-\pi_f)^{x-y_m(n,t)}}{(x-y_m(n,t))!\bar{z}!(1-\pi_e)^{-\bar{z}}} \right), m = 1, \ldots, M$$

and the global $\pi_f, \pi_e$ parameters are updated, e.g., as:

$$\theta_f^{new} = \theta_f^{old} + \alpha(n)\sum_{m=1}^{M} \frac{(\pi_f - \pi_f^2)}{G(n,m,t)}\left(\frac{y_m(n,t)}{\pi_f} - \right. \tag{21}$$

$$\left. \sum_{x=y_m(n,t)}^{A_m-B_m(n,t)+y_m(n,t)} \frac{\lambda_m(t)^x(A_m-x)!(1-\pi_f)^{x-y_m(n,t)-1}}{(x,y_m(n,t)-1)!\bar{z}!(1-\pi_e)^{\bar{z}}} \right),$$

and $$\theta_e^{new} = \theta_e^{old} + \alpha(n)\sum_{m=1}^{M} \frac{(\pi_e - \pi_e^2)}{G(n,m,t)}\left(\frac{B_m(n,t) - y_m(n,t)}{\pi_e} - \right.$$

$$\left. \sum_{x=y_m(n,t)}^{A_m-B_m(n,t)+y_m(n,t)} \frac{\lambda_m(t)^x(A_m-x)!(1-\pi_f)^{x-y_m(n,t)}}{(x-y_m(n,t))!(1-\pi_e)^{1-\bar{z}}(\bar{z}-1)!} \right),$$

where:

$\theta_f = \log(\pi_f/(1-\pi_f))$, $\theta_e = \log(\pi_e/(1-\pi_e))$, $\bar{z} = A_m - x + y_m(n,t) - B_m(n,t)$, and $G(n,m,t) =$ $$\sum_{x=y_m(n,t)}^{A_m-B_m(n,t)+y_m(n,t)} \frac{\lambda_m(t)^x(A_m-x)!(1-\pi_f)^{x-y_m(n,t)}(1-\pi_e)^{\bar{z}}}{(x-y_m(n,t))!\bar{z}!}$$

This updates the parameters of the model ($\pi_f$, $\pi_e$ and $\lambda$) independently of time, i.e., $\pi_f^{new} = \pi_f^{old} + \alpha(n)\partial \log(p(D|\lambda,\pi_f,\pi_e))/\partial\pi_f$ and $\pi_e^{new} = \pi_e^{old} + \alpha(n)\partial \log(p(D|\lambda,\pi_f,\pi_e))/\partial\pi_e$ 2.2 Method 2, Version 2

In this version of the noise model, parameters $\pi_f$ and $\pi_e$ are optimized separately for different hours.

This noise model can be used to test a second assumption which is that the parameters $\pi_f$ and $\pi_e$ depend on the volume of traffic and therefore should be chosen separately for different times of day.

The only difference from the Version 1 algorithm is that the parameter $\pi_f$ (and $\pi_e$ respectively) is updated for each hour (or other selected time period) separately using the expression: $\pi_f(t)^{new} = \pi_f(t)^{old} + \alpha(n)\partial \log(p(D_t|\lambda,\pi_f,\pi_e))\partial\pi_f(t)$ instead of as $\pi_f^{new} = \pi_f^{old} + \alpha(n)\partial \log(p(D|\lambda,\pi_f,\pi_e))/\partial\pi_f$. Modification to the optimization problem to account for the constrained nature of $\pi_f$ and $\pi_e$ is made in the same way as in Method 2, Version 1.

The experimental results show that this approach can lead to improved prediction performance on held out data over the Version 1 algorithm. However, this may not always be the case, depending on the type of sensors used and other factors. One conclusion of the experiments was that the obtained values of $\pi_f$ and $\pi_e$ for midday significantly differ from the ones obtained for times of day with less traffic (late night and early morning). Going a step further, $\pi_f$ and $\pi_e$ may be optimized for each blockface separately. However, the performance may worsen as a result of over-fitting (this version will be referred to as Version 2a). To avoid the problem of over-fitting, a mixture model may be employed, which optimizes $\pi_f$ and $\pi_e$ for two or more different groups of blockfaces (as described in Version 3).

2.3 Method 2, Version 3: Mixture Model

In the examples described below, it was found that the $\pi_f$ and $\pi_e$ parameters may depend on the volume of traffic as well as the time of day. This suggests that an additional assumption can be made. In this version of the noise model, it is assumed that the sensors in general share similar $\pi_f$ and $\pi_e$ features but can be divided into different groups (In the examples, the case of two groups is demonstrated and tested, although it is to be appreciated that there may be any number of groups, such as from 2-20). Such a model can capture several sensor logics. For instance, it can identify the case where sensors at blockfaces with high traffic and sensors at blockfaces with low traffic have different characteristics. Such characteristics can be automatically captured by the model.

This case can be modeled using a simple mixture model. The noise model probability can be defined as:

$$\mathbb{P}(Y, B | \lambda, A, \pi_f^1, \pi_e^1, \pi_f^2, \pi_e^2, w) = \tag{22}$$

$$w\cdot\mathbb{P}(Y, B | \lambda, A, \pi_f^1, \pi_e^1) + (1-w)\cdot\mathbb{P}(Y, B | \lambda, A, \pi_f^2, \pi_e^2),$$

where w is an additional weight parameter to be induced from the data. This parameter is determined separately for each block and hour. The log likelihood of such a model can be written as:

$$L = \sum_{t=1}^{24}\sum_{n=1}^{N}\sum_{m=1}^{M} \log(w_m \cdot \mathbb{P}(y_m(n,t), B_m(n,t) | \lambda_m(t), A_m, \pi_f^1(t), \pi_e^1(t)) + \tag{23}$$

$$(1-w_m)\cdot\mathbb{P}(y_m(n,t), B_m(n,t) | \lambda_m(t), A_m, \pi_f^2(t), \pi_e^2(t))).$$

For compactness of notation, let:

$\mathbb{P}_1(n,m,t) \equiv \mathbb{P}(y_m(n,t), B_m(n,t)|\lambda_m(t), A_m, \pi_f^1(t), \pi_e^1(t))$ and $\mathbb{P}_1(n,m,t) \equiv \mathbb{P}(y_m(n,t), B_m(n,t)|\lambda_m(t), A_m, \pi_f^2(t), \pi_e^2(t))$.

The maximum likelihood estimation of the parameters $\lambda, \pi_f^1, \pi_f^2, \pi_e^1, \pi_e^2$ and w can be found by maximizing the log-likelihood function L. After proper modification of the optimization problem to account for all the constraints, the following update rules can be obtained:

$$v_m(t)^{new} = v_m(t)^{old} + \alpha(n)\frac{w_m(t) - w_m(t)^2}{H(n,m,t)}(\mathbb{P}_1(n,m,t) - \mathbb{P}_2(n,m,t)) \tag{24}$$

$$\Lambda_m(t)^{new} = \Lambda_m(t)^{old} + \frac{\alpha(n)\lambda_m(t)}{H(n,m,t)}$$

$$(w_m(t)\nabla_{\lambda_m(t)}\mathbb{P}_1(n,m,t) + (1-w_m(t))\nabla_{\lambda_m(t)}\mathbb{P}_2(n,m,t))$$

-continued $$\theta_f^1(t) = \theta_f^1(t) + \alpha(n)\big(\pi_f^1(t) - \pi_f^1(t)^2\big)\sum_{m=1}^{M}\frac{w_m(t)\nabla_{\pi_f^1(t)}\mathbb{P}_1(n,m,t)}{H(n,m,t)}$$

$$\theta_f^2(t) = \theta_f^2(t) + \alpha(n)\big(\pi_f^2(t) - \pi_f^2(t)^2\big)\sum_{m=1}^{M}\frac{(1-w_m(t))\nabla_{\pi_f^2(t)}\mathbb{P}_2(n,m,t)}{H(n,m,t)}$$

$$\theta_e^1(t) = \theta_e^1(t) + \alpha(n)\big(\pi_e^1(t) - \pi_e^1(t)^2\big)\sum_{m=1}^{M}\frac{w_m(t)\nabla_{\pi_e^1(t)}\mathbb{P}_1(n,m,t)}{H(n,m,t)}$$

$$\theta_e^2(t) = \theta_e^2(t) + \alpha(n)\big(\pi_e^2(t) - \pi_e^2(t)^2\big)\sum_{m=1}^{M}\frac{(1-w_m(t))\nabla_{\pi_e^2(t)}\mathbb{P}_2(n,m,t)}{H(n,m,t)},$$

where $v_m(t) = \log(w_m(t)/(1-w_m(t)))$, $\Lambda_m(t) = \log(\lambda_m(t))$, $\theta_f^1(t) = \log(\pi_f^1(t)/(1-\pi_f^1(t)))$, $\theta_e^1 = \log(\pi_e^1(t)/(1-\pi_e^1(t)))$, $\theta_f^2(t) = \log(\pi_f^2(t)/(1-\pi_f^2(t)))$, $\theta_e^2 = \log(\pi_e^2(t)/(1-\pi_e^2(t)))$ and $H(n,m,t) = w_m(t) \cdot \mathbb{P}_1(n,m,t) + (1-w_m(t)) \cdot \mathbb{P}_2(n,m,t)$.

This model could, of course, be extended to more than two latent parameters using additional $\pi$ probabilities. As will also be appreciated, this version of the model can cover all the models given herein by uniting the various noise probabilities $\pi$, e.g., by setting $\pi_f^1 = \pi_f^2$ etc, and/or setting $\pi_e = \pi_f$. Additionally, if values of two of the $\pi$ probabilities output by the model are equal or almost equal, the model can be simplified to converge the two values.

It will be appreciated that Expectation Maximization (EM) could alternatively be a suitable approach to finding maximum likelihood or maximum a posteriori (MAP) estimates of the parameters of the model in any of the version described herein. In this case it would not lead to exact M-steps. The direct gradient ascent algorithm can be derived quite straightforwardly for this model (as outlined above) and this algorithm may outperform EM in many instances.

To identify a noise model which best fits a set of data (S106), two or more of the above methods can be compared. In one exemplary method, they are compared in terms of the cross-validated negative log-likelihood and/or the mean-squared error (MSE).

The cross validation can be performed a follows: the data is divided into K folds (e.g., one fold for each week of data) which is used to perform the K-fold cross validation. Model parameters can be learned on fewer than all folds, e.g., learned using data from K−1 folds. Then, predictions are made involving the number of operational sensors and the observed occupancy for a held out test fold. This procedure is repeated K times for K different test days.

The average cross-validation Negative Log Likelihood can then be determined as follows. Given $\pi_f$ and $\pi_e$ learned using data from K−1 days, the Negative Log Likelihood on the hold out data $D_K$ can calculated as:

$$N_{LL}(D_K \mid \lambda, \pi_f, \pi_e) =$$
$$-\frac{1}{T \cdot N \cdot M}\sum_{t=1}^{T}\sum_{n=1}^{N}\sum_{m=1}^{M}\log\mathbb{P}(y_m(n,t), B_m(n,t) \mid \lambda_m(t), A_m, \pi_f, \pi_e).$$

where T is the number of time periods (24 in the examples above). The parameters $\lambda, \pi_e, \pi_f$ can be estimated by minimizing the negative log-likelihood function $N_{LL} = -\log p(D \mid \lambda, \pi_f, \pi_e)$, using a suitable software application.

The MSE can be defined as:

$$MSE = \frac{1}{T \cdot N \cdot M}\sum_{t=1}^{T}\sum_{i=1}^{N}\sum_{m=1}^{M}(y_m(n,t) - \hat{y}_m(n,t))^2 \qquad (25)$$

where $\hat{y}$ is the expectation of the observed occupancy (an instantiation of the variable Y):

$$\hat{y} = \mathbb{E}(Y \mid B) = \sum_{y=0}^{B} y \cdot \mathbb{P}(y \mid A, B, \lambda). \qquad (25)$$

Without intending to limit the scope of the exemplary embodiment, the following examples demonstrate the applicability of the various models.

EXAMPLES

An empirical evaluation of the proposed methods for predicting parking occupancy, given variable blockface capacity was performed.

Experimental Setup

The dataset 24 used in these experiments was collected from a publicly available data stream which stores the output of parking sensors over large number of locations in a US city. The data warehouse 22 for this system processes the real time data and provides the following information in 60 second intervals for all M=535 blockfaces currently involved in the parking system.

1. $y_m(t)$: Observed occupancy at blockface in at time t,
2. $B_m(t)$: Number of sensors working at blockface m at time t,
3. $A_m$: Actual capacity of blockface m.

For purposes of the evaluation, observations at the beginning of each hour for N=10 consecutive Thursdays were extracted from the data stream, which are treated as comparable observations for learning the occupancy models.

In the evaluation, only on-street parking was considered and thus the observations which involve parking garages were removed from the data. It is to be appreciated that separate models could be defined for on-street and off-street parking, if desired. Also removed was data for the blockfaces with capacity A≤2 and blockfaces which contain tow-away street cleaning periods as observations at those times are masked (i.e., $y_m(t)$ and $B_m(t)$ are both set to zero). After such preprocessing, the resulting data is a sample of 215 blockfaces. The resulting sample can be denoted as $D_t = \{(y_m(n), B_m(n)), m=1, \ldots, 215, n=1, \ldots, 10\}$, t=1, \ldots, 24.

Evaluation Metrics

The observed parking occupancy prediction model 30 was generated given the observed capacity B under the two proposed approaches described above. In Method 1, $\mathbb{P}(Y \mid A, B, \lambda)$ (the probability of the actual occupancy given the observed occupancy, capacity, and rate) was modeled and thus the expectation of the observed occupancy ŷ can be expressed as:

$$\hat{y} = \mathbb{E}(Y \mid B) = \sum_{y=0}^{B} y \cdot \mathbb{P}(Y \mid A, B, \lambda). \quad (26)$$

In the second method (Method 2), the probability $\mathbb{P}(Y|A, B, \lambda)$ is not directly available, as it is $\mathbb{P}(Y|A,B,\lambda)(Y,B|A,\lambda,\pi_f,\pi_e)$ which is being modeled, and thus the marginal probability $\mathbb{P}(B)$ can be utilized. The expectation of the observed occupancy ŷ in this approach is:

$$\hat{y} = \mathbb{E}(Y \mid B) = \sum_{Y=0}^{B} Y \cdot \frac{\mathbb{P}(Y, B \mid A, \lambda, \pi_f, \pi_e)}{\sum_{Y=0}^{B} \mathbb{P}(Y, B \mid A, \lambda, \pi_f, \pi_e)} \quad (27)$$

Performance was studied both in terms of negative log-likelihood $N_{LL}$ and in terms of mean-squared error MSE.

A 10-fold cross-validation was performed and the exemplary methods were compared in terms of the cross-validated negative log-likelihood and the mean-squared error (MSE) defined according to Equation (25) as:

$$MSE = \frac{1}{24 \cdot N \cdot M} \sum_{t=1}^{24} \sum_{i=1}^{N} \sum_{m=1}^{M} (y_m(n, t) - \hat{y}_m(n, t))^2 \quad (25)$$

The cross validation was performed a follows: There were 10 weeks of data which were used to perform the 10-fold cross validation. Model parameters were learned using data from 9 days. Then, predictions were made involving the number of operational sensors and the observed occupancy for the 10th held out day. This procedure was repeated 10 times for 10 different test days.

The average cross-validation Negative Log Likelihood was determined as follows. Given $\pi_f$ and $\pi_e$ learned using data from 9 days, the Negative Log Likelihood on the hold out data $D_{10}$ was calculated as:

$$N_{LL}(D_{10} \mid \lambda, \pi_f, \pi_e) =$$

$$-\frac{1}{24 \cdot N_{10} \cdot 215} \sum_{t=1}^{24} \sum_{n=1}^{N} \sum_{m=1}^{215} \log \mathbb{P}(y_m(n, t), B_m(n, t) \mid \lambda_m(t), A_m, \pi_f, \pi_e).$$

The parameters $\lambda, \pi_e, \pi_f$ were estimated by minimizing the negative log-likelihood function $N_{LL} = -\log p(D|\lambda, \pi_f, \pi_e)$ using the fminunc Matlab solver.

Results

Method 1

Figure 3:
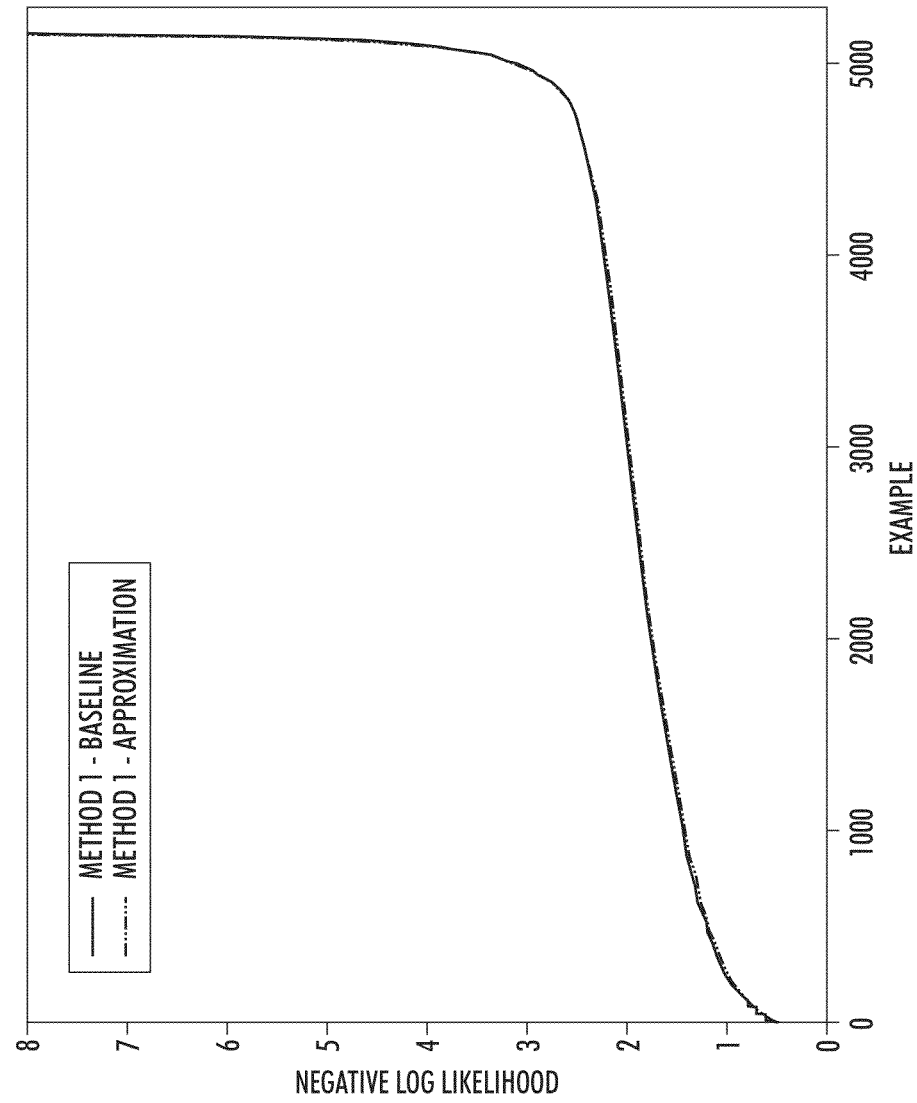
FIG. 3 is a plot illustrating a performance comparison of two noise model generation methods (Method 1-baseline and Method 1-approximation) in terms of cross-validated negative log-likelihood.
Figure 4:
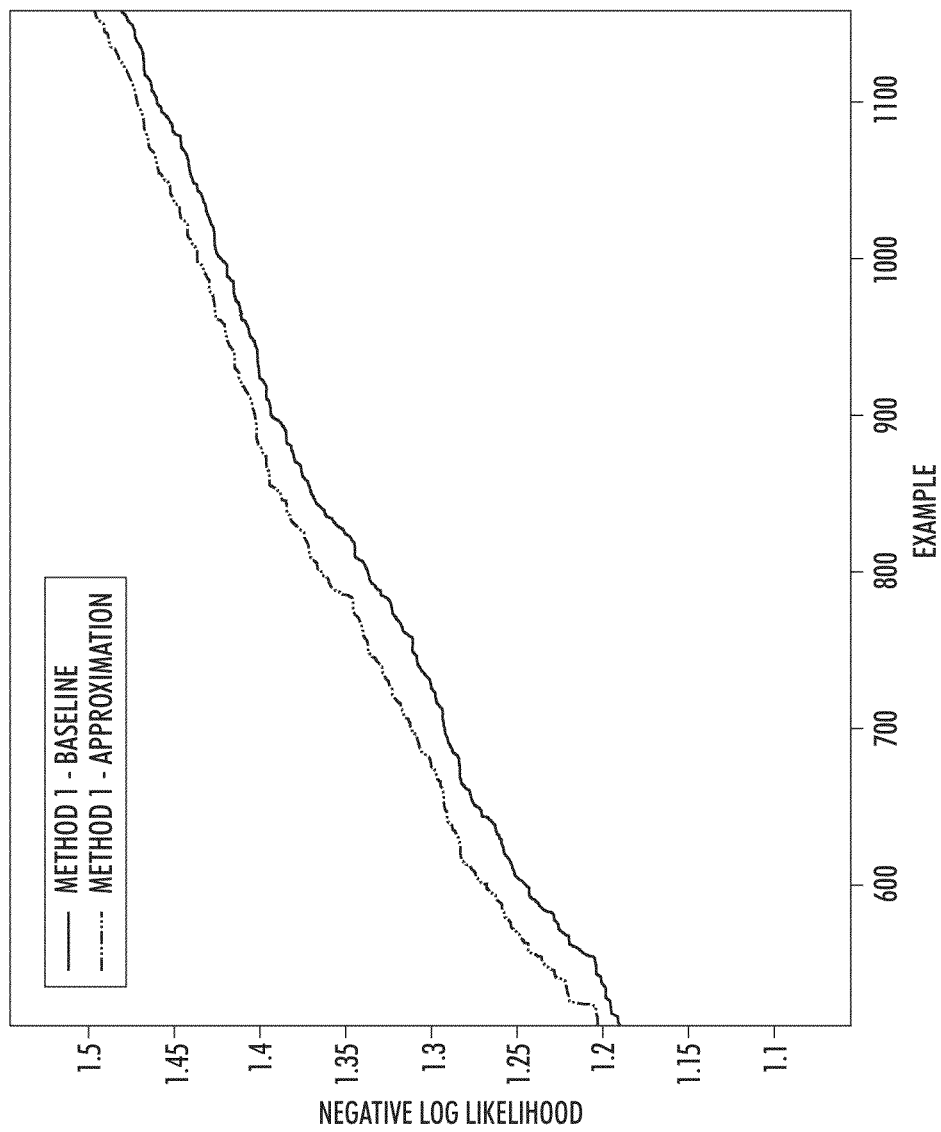
FIG. 4 is a zoomed section of the plots of FIG. 3.

FIG. 3 shows a performance comparison of cross-validated negative log-likelihood for the two methods under Method 1, in the baseline version (Method 1, version 1) and in the approximation version (Method 1, version 2). As can be observed, the approximation version of the method performs exceptionally well. A portion of the graph shown in FIG. 3 is shown in FIG. 4, which shows only small deviations between the baseline and the approximation methods.

Method 2

Figure 5:
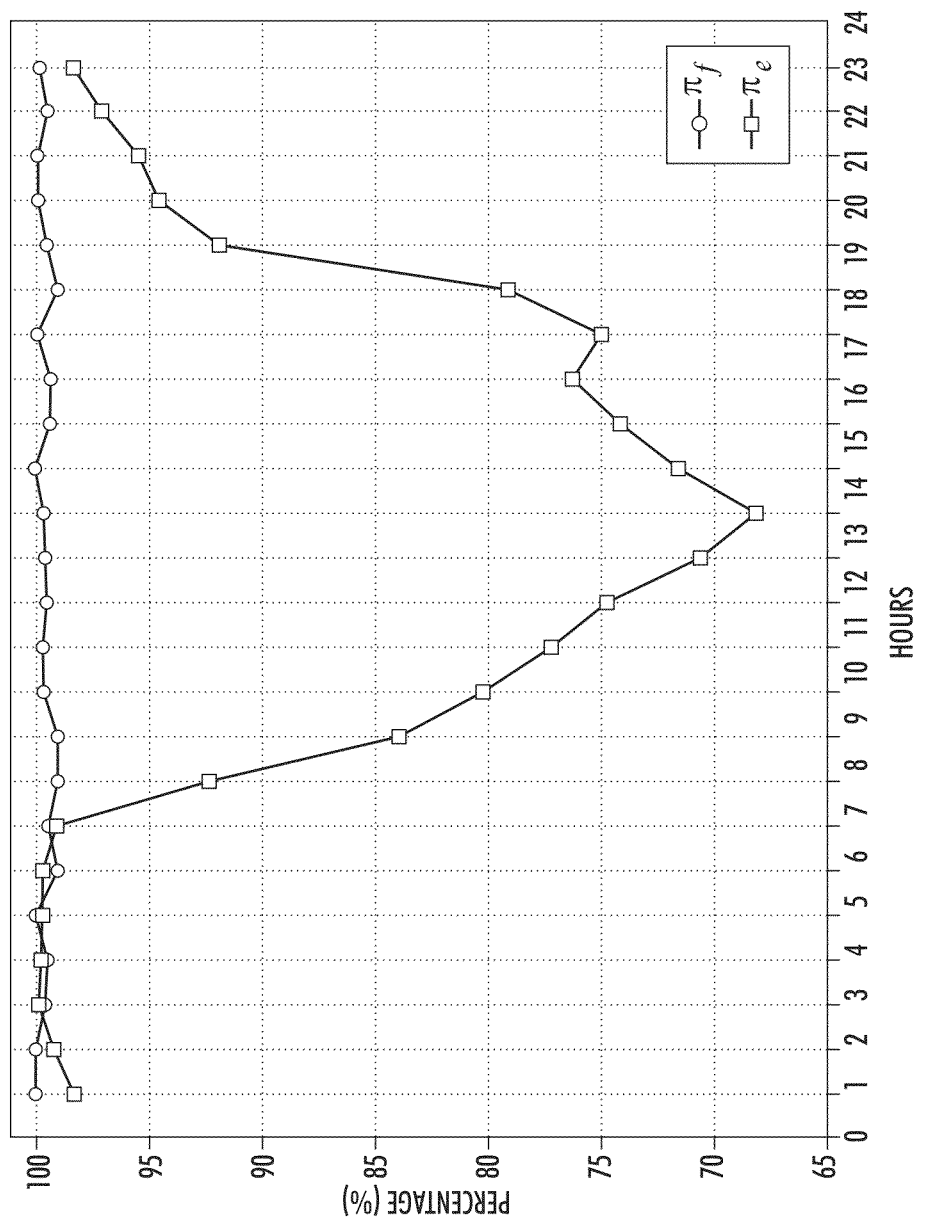
FIG. 5 is a plot illustrating percentage changes $\pi_f$ and $\pi_e$ values in Method 2, Version 2 for noise model generation.

In this experiment, the four versions of the method under Method 2 were compared. In the first version, the parameters $\pi_f$ and $\pi_e$ are tied across all blocks and hours, which, after training, resulted in values $\pi_f=0.975$ and $\pi_e=0.917$. In the second version, they are learned for each hour separately, which results in the values of $\pi_f$ and $\pi_e$ shown in FIG. 5, where the values are shown as the percentage of the maximum value. FIG. 5 suggests that parameters $\pi_f$ and $\pi_e$ are traffic dependent as they differ the most when the volume of traffic is high (midday).

Figure 6:
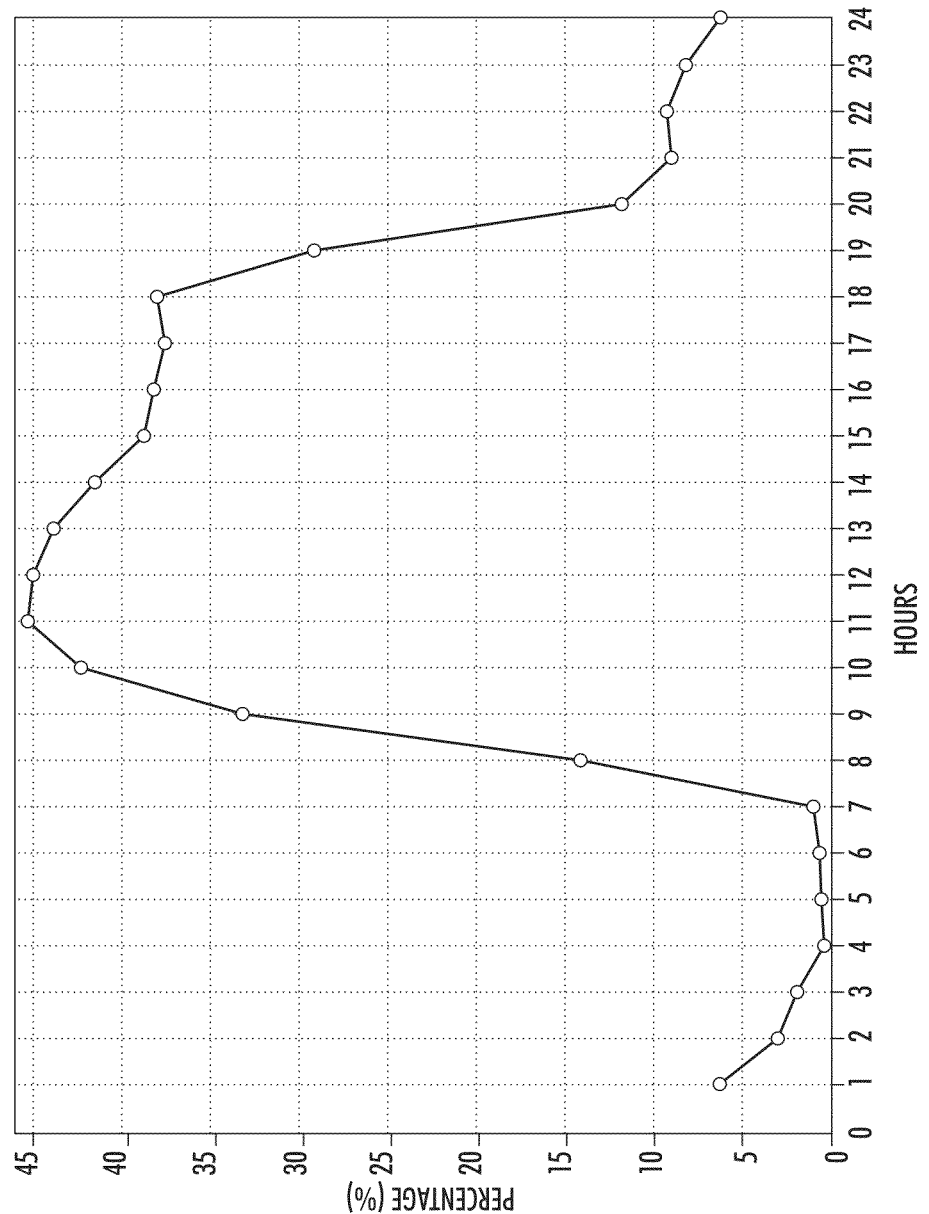
FIG. 6 is a plot illustrating the average percentage of blockfaces with variable capacity throughout the day.

For investigation purposes, a plot was generated showing how the percentage of blockfaces with variable capacity (at least one non-operating sensor) changes over the different hours of day (FIG. 6). By examining FIG. 6, it can be concluded that there is a high correlation between $\pi_e$ and percentage of blockfaces with variable capacity.

Figure 7:
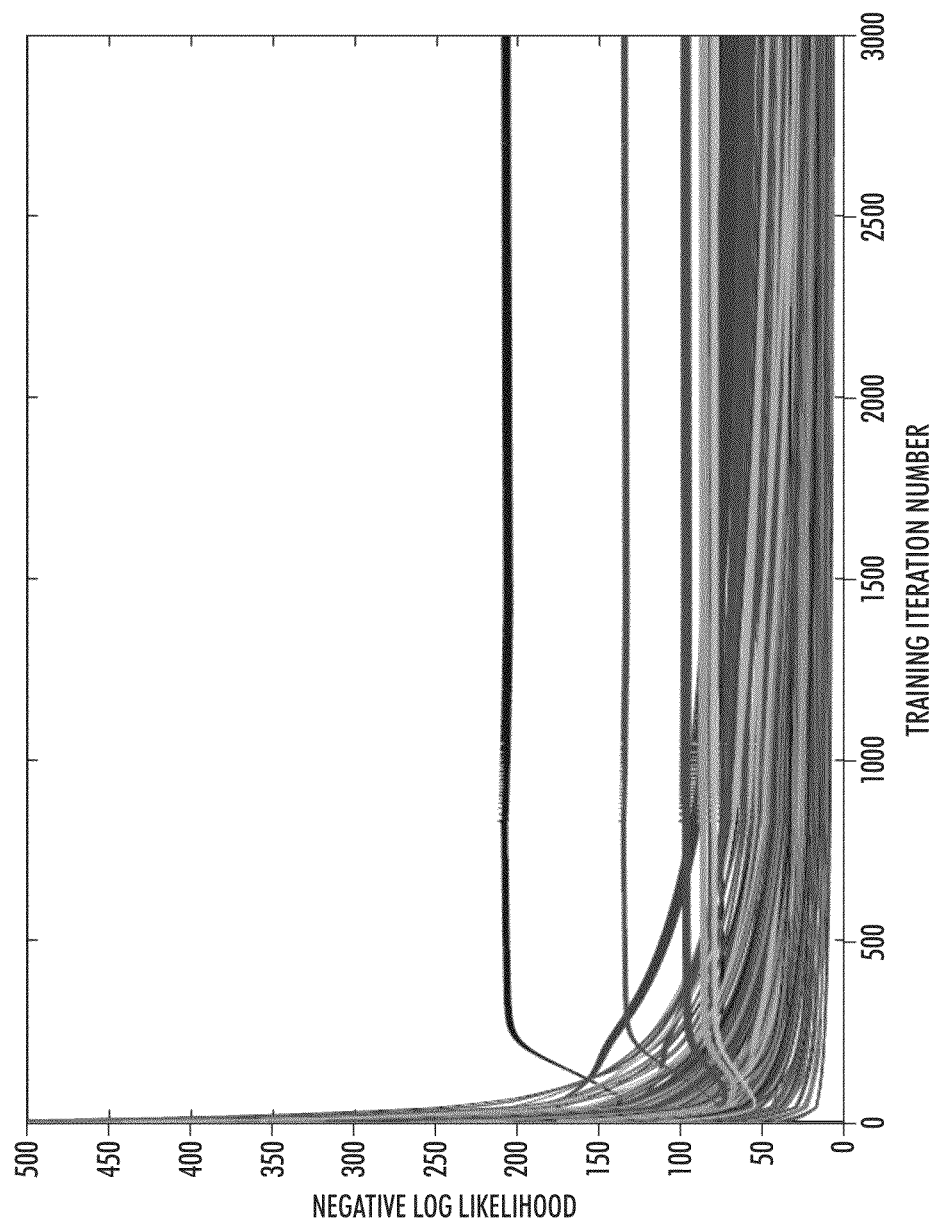
FIG. 7 is a plot illustrating Negative Log-Likelihood change for separate blockfaces during training (Method 2, version 2) (t=18), where only a few of the blockfaces are illustrated as examples.
Figure 8:
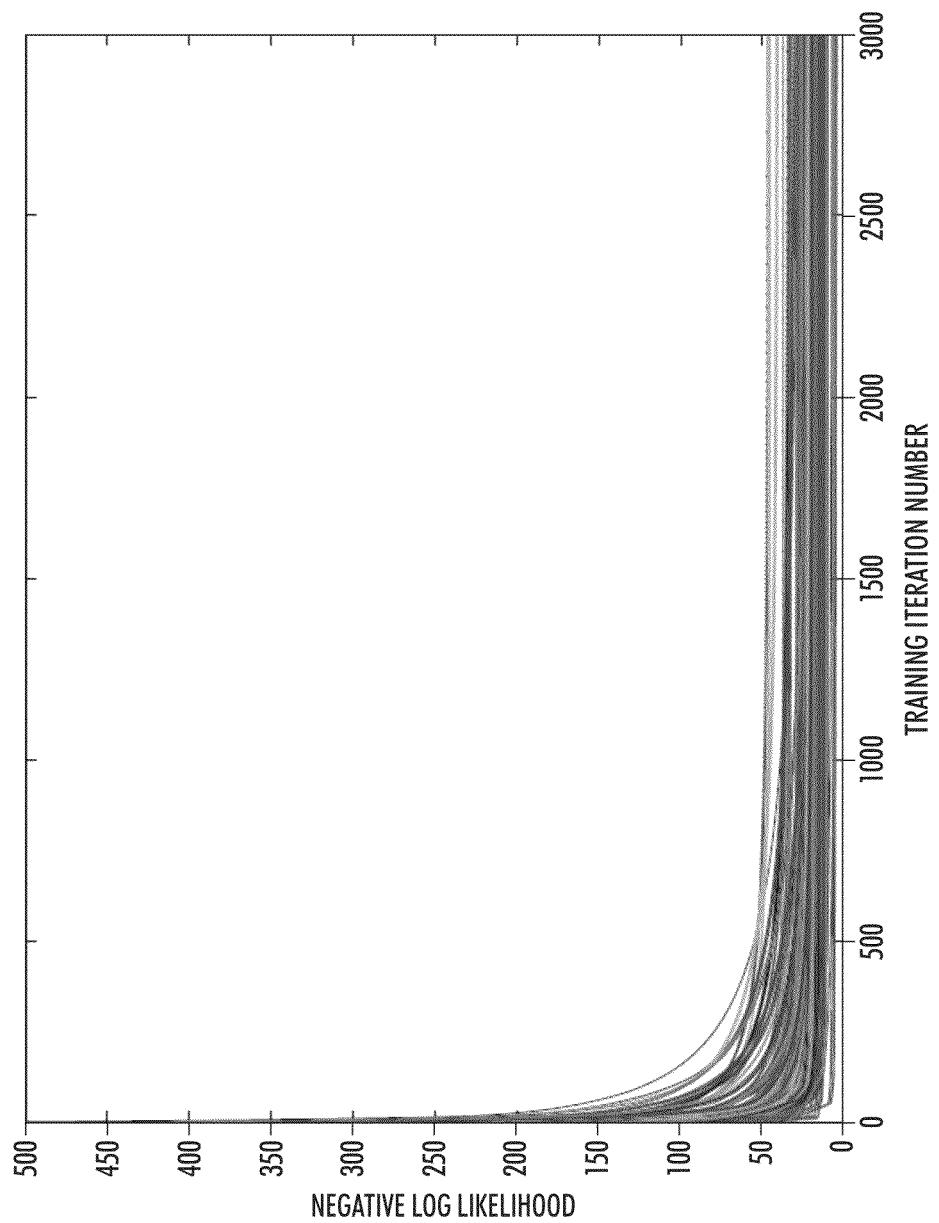
FIG. 8 is a plot illustrating Negative Log-Likelihood change for separate blockfaces during training (Method 2, version 2a) (t=18), where only a few of the blockfaces are illustrated as examples.
Figure 9:
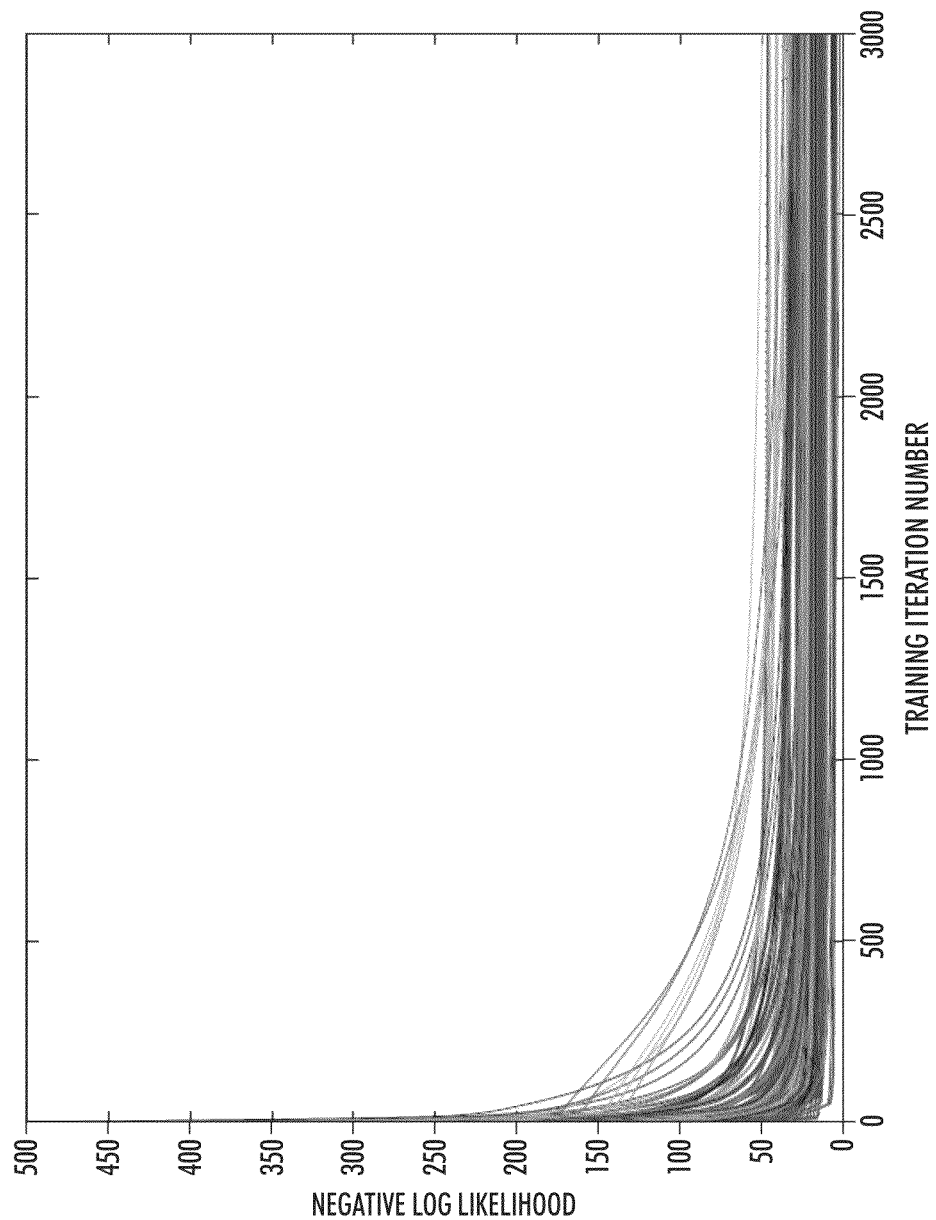
FIG. 9 is a plot illustrating Negative Log-Likelihood change for separate blockfaces during training (Method 2, version 3, mixture model)(t=18), where only a few of the blockfaces are illustrated as examples.

The Negative Log-Likelihood change for separate blockfaces was also plotted during training for Method 2, version 2 (t=18) (FIG. 7), Method 2, version 2a (t=18) (FIG. 8), and Method 2, version 3 (t=18) (FIG. 9). FIGS. 7-9 show just a sample of the blockface results to illustrate the variations. The results indicate that for most of the blockfaces, an approximately minimum value of the negative log likelihood was reached in about 500-1000 iterations of the gradient ascent method, with Version 2a achieving a minimum faster than versions 2 and 3, and showing fewer blockfaces where the results were outliers than version 2.

Figure 10:
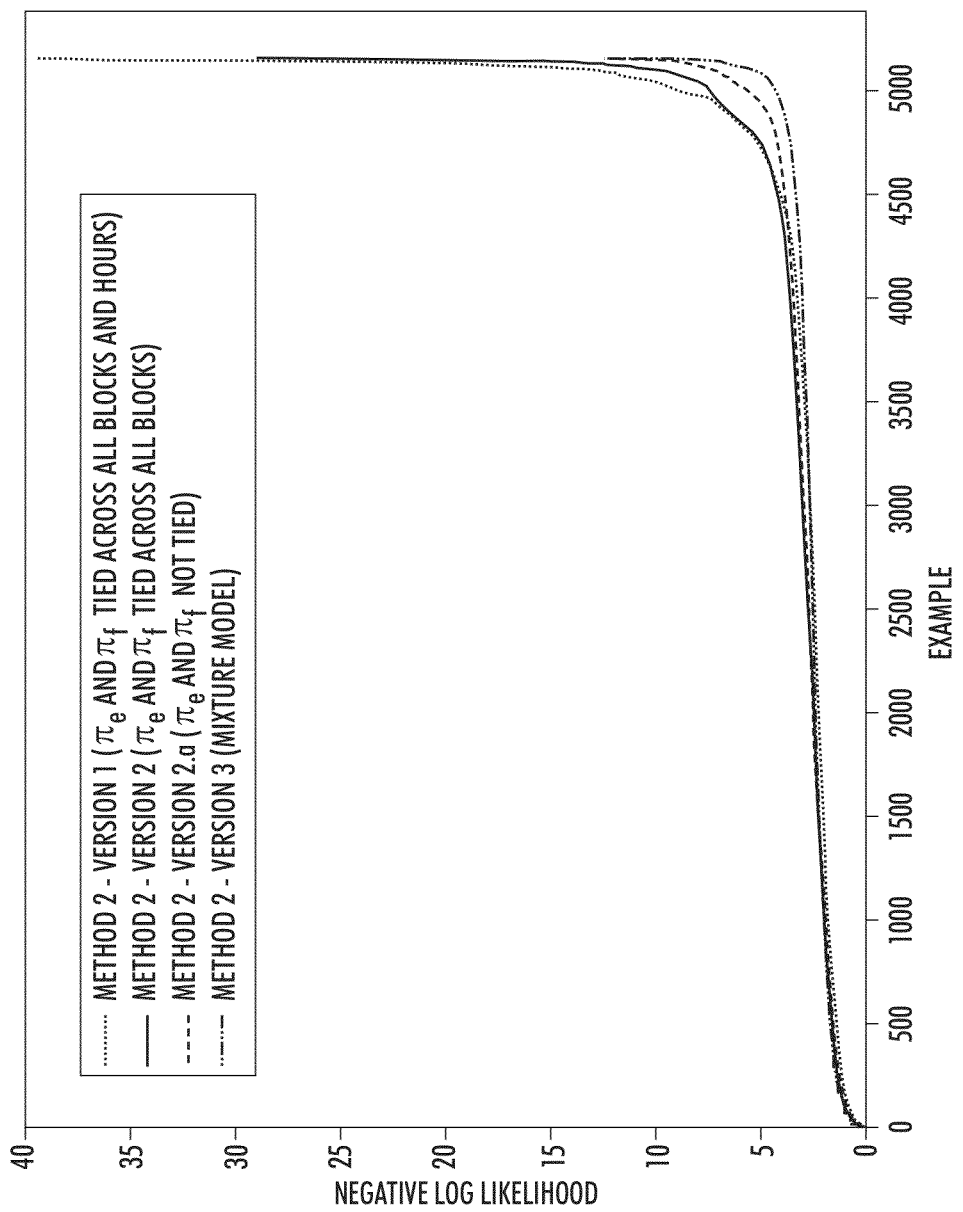
FIG. 10 is a plot illustrating a performance comparison of Method 2, Versions 1, 2, 2a, and 3 in terms of cross-validated negative log-likelihood.

FIG. 10 shows performance comparison of the methods under Method 2 in terms of cross-validated negative log-likelihood. By examining FIG. 10, it can be seen that fitting $\pi_f$ and $\pi_e$ for different hours separately (Method 2, version 3) improves performance in this example. However, there is still room for improvement, based on a review of how the negative log-likelihood of separate blockfaces changes during training for a specific hour (t=18) in Method 2, version 2 (FIG. 7). The results indicate that the parameters $\pi_f$ and $\pi_e$ learned for that specific hour are a good fit for some blocks but not for all. As $\pi_f$ and $\pi_e$ are likely to be traffic dependent, the results suggest that they should also be chosen differently for high-traffic blockfaces and low-traffic blockfaces.

One option is to fit them separately for different blockfaces. This modification results in better learning behavior as can be observed in FIG. 9. However, as results in FIG. 10 suggest, this can lead to over-fitting.

Figure 11:
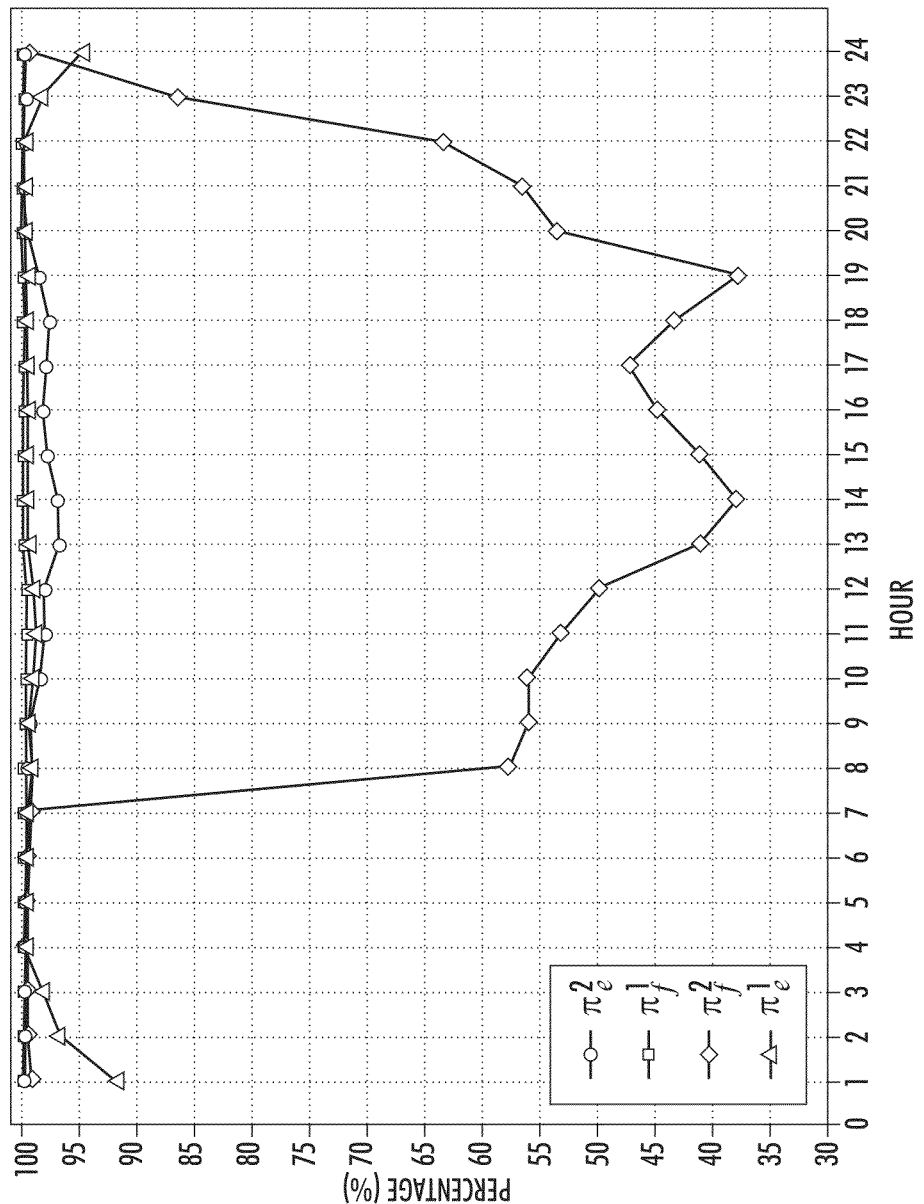
FIG. 11 is a plot illustrating percentage change in $\pi_f^1, \pi_e^1$ and $\pi_f^2, \pi_e^2$ values throughout the day, obtained by Method 2, Version 3.

The second option is to use a mixture model (Method 2, Version 3). The mixture model shows better learning behavior (FIG. 8) without the effect of over-fitting (FIG. 10). The resulting $\pi_f^1, \pi_e^1$ and $\pi_f^2, \pi_e^2$ values (as a percentage of the maximum) are shown in FIG. 11. FIG. 11 shows that the two mixtures have $\pi_f$ and $\pi_e$ parameters which are in two different ranges.

FIG. 10, which presents the comparison of cross-validated negative log-likelihood for all versions of Method 2, shows that the mixture model (Method 2, Version 3) is the best solution to the variable capacity problem in this example.

Figure 12:
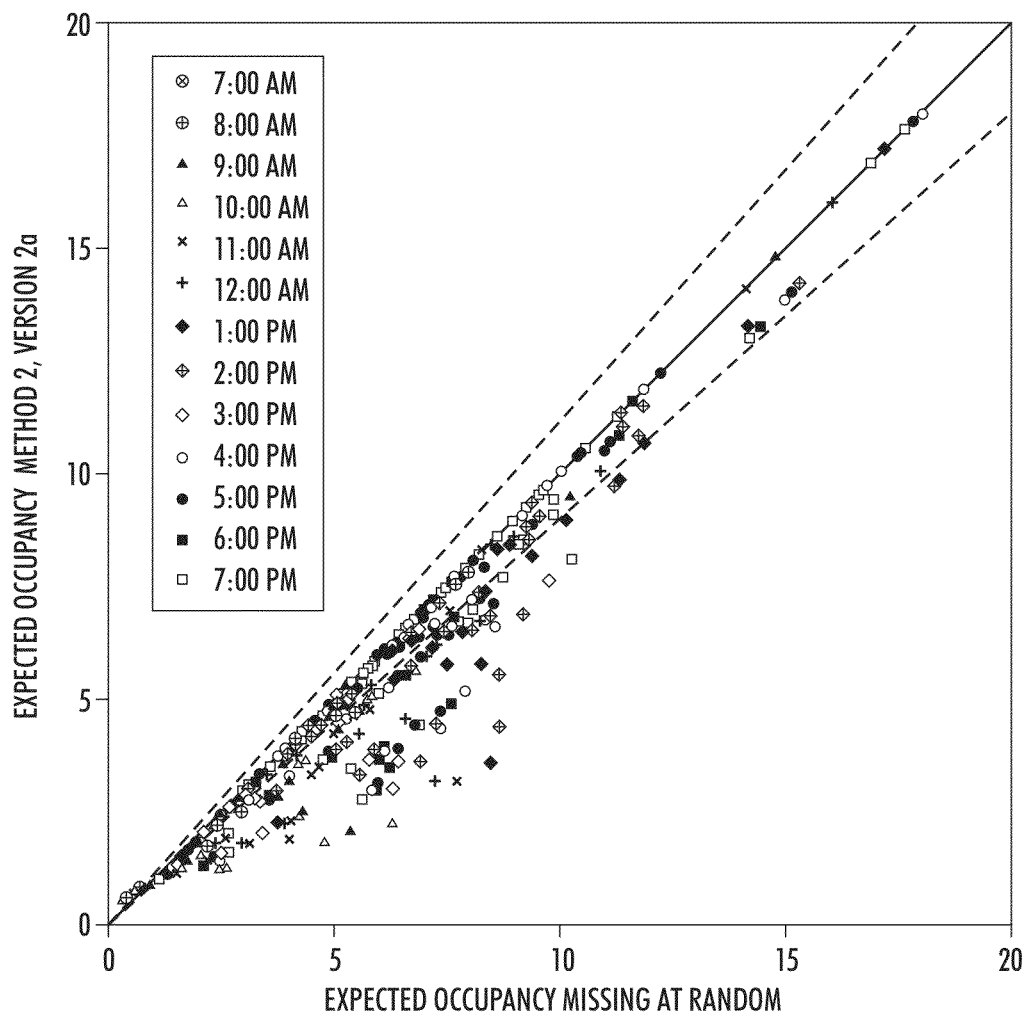

In FIG. 12, the y-axis shows expected occupancy according to the method based on Method 2, Version 2a. The x-axis shows expected occupancy using empirical ratios, with missing values imputed using a missing-at-random assumption. In other words, in the missing at random assumption, if Y is the number of observed occupied spots, B the observed number of working sensors, A the capacity, then X, the inferred actual number of occupied spots, follows from $$\frac{Y}{B} = \frac{X}{A} \text{ i.e. } X = \frac{YA}{B}.$$

FIG. 11 shows that the probability of a sensor failing is higher when spots are empty then when spots are full. This explains the strong bias seen in the missing at random assumption illustrated in FIG. 12. This bias is pointing in the "wrong" direction as can be learned from the out-of-sample prediction experiments (Table 1). Table 1 shows a comparison of all the discussed methods in terms of the cross-validated mean-squared error (MSE). It can be concluded that the methods described in Method 1 perform worse than the ones described in Method 2 in this example. It can also be concluded that the best way to fit $\pi_f$ and $\pi_e$ is using a mixture model. The gap between the mean-squared error $MSE_6$ of the mixture model of Method 2, Version 3 and the MSE, of the approximation model of Method 1, Version 2 corresponds to approximately 7.5% $((\sqrt{MSE_2}-\sqrt{MSE_6})/<Y>=0.075)$.

TABLE 1

Performance Comparison of Parking Occupancy
Prediction Algorithms in terms of MSE

| Algorithm | Cross-validated MSE (+/−STD) |
| --- | --- |
| Method 1- version 1 (Baseline) | 5.82 +/− 1.59 |
| Method 1 - version 2 (Approximation) | 6.21 +/− 1.63 |
| Method 2 - Version 1 ($\pi_f$, $\pi_e$ tied across all blocks and hours) | 4.46 +/− 1.76 |
| Method 2 - Version 2 ($\pi_f$, $\pi_e$ tied across all blocks) | 4.38 +/− 1.49 |
| Method 2 - Version 2.a ($\pi_f$, $\pi_e$ not tied) | 4.40 +/− 1.61 |
| Method 2 - Version 3 (mixture) | 4.18 +/− 1.47 |

Practical Impact

It is clear from the foregoing that demand management approaches that have occupancy as part of their performance metric will be greatly influenced by sensor inaccuracies. FIG. 12 makes clear how a method based on a missing-at-random assumption (Method 1, version 1) can lead to significant biases. Method 2, Version 2a predicts occupancy better than a missing-at-random approach.

The dashed lines in FIG. 12 are at 90% confidence. It can be seen that a large number of the predictions of the missing-at random model are more than 10% off, which would have a severe negative impact on any demand management approach that has occupancy as part of the target.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer implemented method comprising:
receiving occupancy data for each of a plurality of zones, each zone comprising a respective set of cells and including a sensor for each of the cells in the set of cells, each of the cells being in one of a plurality of occupancy states at a time, the occupancy states including an occupied state and an unoccupied state, each of the sensors being in only one of a reporting state, in which the sensor reports the occupancy state of the respective cell, and a non-reporting state, in which the sensor does not report the occupancy state of the cell, at a time, the occupancy data comprising, for each of a plurality of times:
an observed occupancy, which is based on a number of cells in the respective zone that are reported by the sensors to be in the occupied state, and
a number of the sensors in the respective zone that are in the reporting state, at least one of the sensors of at least some of the zones being in the non-reporting state for at least one of the plurality of times;
with a processor, learning at least one predictive occupancy model configured for predicting an occupancy of at least one of the zones, the learning being based on at least a portion of the received occupancy data, at least one of the at least one predictive occupancy models including a sensor noise model which assumes that a probability of a sensor being in the reporting state is dependent on whether the respective cell is in the occupied state.

2. The method of claim 1, wherein the at least one occupancy model comprises a plurality of predictive occupancy models, each of the plurality of occupancy models comprising a respective different noise model.

3. The method of claim 2, further comprising evaluating the plurality of predictive occupancy models to identify one of the plurality of predictive occupancy models which best fits at least a portion of the received occupancy data.

4. The method of claim 1, wherein the occupancy model comprises at least one noise model selected from the group consisting of:
a noise model which assumes that the probability of a sensor being in the reporting state is independent of whether the respective cell is in the occupied state;
a noise model which assumes that the probability of a sensor being in the reporting state is dependent on a time parameter;
a noise model which assumes that the probability of a sensor being in the reporting state is dependent on location parameter;
a noise model which assumes that the probability of a sensor being in the reporting state is dependent on latent parameter selected from a finite set of latent parameters; and
combinations thereof.

5. The method of claim 1, wherein the occupancy model further comprises a demand model which predicts occupancy of each zone as a function of a capacity of the zone and an occupancy rate, the capacity of each zone being based on a total number of the cells in the respective set of cells.

6. The method of claim 5, wherein the demand model assumes that a Poisson distribution relates the predicted occupancy of each zone to the capacity of the zone and the occupancy rate.

7. The method of claim 5, wherein the learning comprises learning the demand model and the sensor noise model together in an iterative process.

8. The method of claim 5, wherein the learning comprises optimizing a log-likelihood function of parameters of the occupancy model in an iterative process.

9. The method of claim 1, wherein the learning includes learning parameters of the occupancy model, the parameters include at least one occupancy rate.

10. The method of claim 1, wherein the learning includes learning parameters of the occupancy model, the parameters including probability parameters, the probability parameters including a probability that a sensor is reporting if the respective cell is occupied, and a probability that a sensor is reporting if the respective is unoccupied.

11. The method of claim 10, wherein the probability parameters include for each of a plurality of times, a probability that a sensor is reporting if the respective cell is occupied, and a probability that a sensor is reporting if the respective cell is unoccupied.

12. The method of claim 11, wherein the probability parameters include for each of a plurality of times, a probability that a sensor is reporting if the respective cell is occupied, and a probability that a sensor is reporting if the respective cell is unoccupied.

13. The method of claim 11, wherein the probability parameters include for each of a plurality of locations, a probability that a sensor is reporting if the respective cell is occupied, and a probability that a sensor is reporting if the respective cell is unoccupied.

14. The method of claim 11, wherein the probability parameters include for each of a plurality of latent types, a probability that a sensor is reporting if the respective cell is occupied, and a probability that a sensor is reporting if the respective cell is unoccupied.

15. The method of claim 1, further comprising at least one of:
  a) receiving current occupancy data and predicting an actual occupancy of at least one of the zones with the learned occupancy model;
  b) predicting occupancy of at least one of the zones at each of a plurality of times with the learned occupancy model and establishing a pricing schedule for the at least one zone based on the predicted occupancies; and
  c) where the at least one occupancy model comprises a plurality of occupancy models, identifying a failure hypothesis based on identifying one of the occupancy models which best fits the occupancy data; and
  d) comparing predicted occupancy output by the occupancy model with other occupancy-related data for the cells of at least one of the zones.

16. The method of claim 1, wherein the predicted occupancy of the zone includes a predicted occupancy of cells in the at least one zone which have a sensor in the non-reporting state.

17. The method of claim 1, wherein the zones comprise parking zones and the cells comprise parking spaces which are in the occupied state when occupied by a vehicle.

18. A computer program product comprising a non-transitory recording medium storing instructions, which when executed on a computer causes the computer to perform the method of claim 1.

19. A system comprising memory storing instructions for performing the method of claim 1, and a processor in communication with the memory which implements the instructions.

20. The method of claim 1, wherein for each zone each of the respective set of cells is sized to receive only a single vehicle.

21. An occupancy prediction system comprising:
  memory which receives occupancy data for each of a plurality of zones, each zone comprising a respective set of cells and including a sensor for each of the cells in the set of cells, each of the cells being in one of an occupied state and an unoccupied state at a time, each of the sensors being in one of a reporting state, in which the sensor reports the occupancy state of the respective cell, and a non-reporting state, in which the sensor does not report the occupancy state of the cell, at a time, the occupancy data comprising:
    an observed occupancy, which is based on a number of cells in the respective zone that are reported to be in the occupied state, and
    a number of the sensors in the respective zone that are in the reporting state;
  at least one occupancy model stored in memory which is configured for predicting occupancy of at least one of the zones, the predicted occupancy including a predicted occupancy of cells in the at least one zone which have a sensor in the non-reporting state, each of the at least one occupancy models being based on:
    a demand model which predicts occupancy of each zone as a function of a capacity of the zone and an occupancy rate, the capacity of each zone being based on a total number of the cells in the respective set of cells; and
    a respective sensor noise model, at least one of the sensor noise models assuming that a probability of a sensor being in the reporting state is dependent on whether the respective cell is in the occupied state or the unoccupied state.

22. The system of claim 21, wherein the at least one occupancy model comprises a plurality of occupancy models.

23. The system of claim 22, further comprising a model testing component for testing the plurality of occupancy models on occupancy data to identify one of the models which best fits the data.

24. The system of claim 23, further comprising a model learning component for learning the at least one occupancy model using occupancy data for the zones at a plurality of times.

25. A computer implemented method comprising:
  providing at least one occupancy model which is configured for predicting occupancy of at least one of a plurality of zones, each zone comprising a respective set of cells and including a sensor for each of the cells in the set of cells, each of the cells being in one of an occupied state and an unoccupied state at a time, each of the sensors being in one of a reporting state and a non-reporting state at a time, the predicted occupancy including a predicted occupancy of cells in the at least one zone which have a sensor in the non-reporting state, each of the at least one occupancy models being based on a demand model and a respective sensor noise model jointly learned from prior occupancy data acquired for the at least one zone, at least one of the noise models assuming that a probability of a sensor being in the reporting state is dependent on whether the respective cell is in the occupied state, the demand model predicting occupancy of each zone as a function of a capacity of the zone and an occupancy rate, the capacity of each zone being based on a total number of the cells in the respective set of cells;
  with a computer system, receiving current occupancy data for at least one of the plurality of zones, the current and prior occupancy data comprising:
    an observed occupancy, which is based on a number of cells in the respective zone that are reported to be in the occupied state, and
    a number of the sensors in the respective zone that are in the reporting state, wherein at least one of the sensors is in the non-reporting state and the occupancy state of the at least one sensor in the non-reporting state is not known by the computer system; and with a processor of the computer system, predicting an occupancy of the at least one of the zones using at least one of the at least one occupancy models.

* * * * *